US012598412B2

(12) United States Patent
Guo et al.

(10) Patent No.: US 12,598,412 B2
(45) Date of Patent: Apr. 7, 2026

(54) SOUND SIGNAL PROCESSING METHOD AND HEADSET DEVICE

(71) Applicant: Honor Device Co., Ltd., Shenzhen (CN)

(72) Inventors: Lu Guo, Shenzhen (CN); Jun Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 170 days.

(21) Appl. No.: 18/562,609

(22) PCT Filed: Jan. 6, 2023

(86) PCT No.: PCT/CN2023/071087
§ 371 (c)(1),
(2) Date: Nov. 20, 2023

(87) PCT Pub. No.: WO2023/160275
PCT Pub. Date: Aug. 31, 2023

(65) Prior Publication Data

US 2024/0251197 A1 Jul. 25, 2024

(30) Foreign Application Priority Data

Feb. 28, 2022 (CN) ......................... 202210193354.7

(51) Int. Cl.
*H04R 1/10* (2006.01)
*G10K 11/178* (2006.01)

(52) U.S. Cl.
CPC ..... *H04R 1/1091* (2013.01); *G10K 11/17854* (2018.01); *H04R 1/1016* (2013.01); *G10K 2210/1081* (2013.01); *H04R 2460/01* (2013.01)

(58) Field of Classification Search
None
See application file for complete search history.

(56) References Cited

U.S. PATENT DOCUMENTS

2018/0115818 A1* 4/2018 Asada .............. G10K 11/17881
2019/0215622 A1 7/2019 Liebich et al.
(Continued)

FOREIGN PATENT DOCUMENTS

CN 113132841 A 12/2019
CN 113676803 A * 11/2021 ............. H04R 1/008
(Continued)

OTHER PUBLICATIONS

Liebich S. et al., "Active Occlusion Cancellation with Hear-Through Equalization for Headphones," 2018 IEEE International Conference on Acoustics, Speech and Signal Processing (ICASSP), Calgary, AB, Canada, Apr. 15, 2018, pp. 241-245.

*Primary Examiner* — Walter F Briney, III
(74) *Attorney, Agent, or Firm* — Conley Rose, P.C.

(57) ABSTRACT

A sound signal processing method and a headset device. A target filter and a first audio processing unit are added. The target filter processes an external sound signal collected by an external microphone, to obtain an environmental sound attenuation signal and a voice attenuation signal. The first audio processing unit removes, based on the environmental sound attenuation signal and the voice attenuation signal, a second external environmental sound signal and a second voice signal from an in-ear sound signal collected by an error microphone, to obtain a blocking signal, and transmits the blocking signal to a feedback filter. The feedback filter may generate an inverted noise signal corresponding to the blocking signal and play the inverted noise signal through a speaker.

20 Claims, 15 Drawing Sheets

(56) References Cited

U.S. PATENT DOCUMENTS

| | | | | |
|---|---|---|---|---|
| 2020/0020313 | A1* | 1/2020 | Hua | H04R 1/1016 |
| 2020/0152185 | A1* | 5/2020 | Usher | H04R 1/1041 |
| 2021/0281945 | A1 | 9/2021 | Goldstein et al. | |
| 2021/0409860 | A1* | 12/2021 | Bean | H04R 1/1091 |
| 2022/0189497 | A1* | 6/2022 | Rui | H04R 1/1083 |
| 2022/0335924 | A1* | 10/2022 | Qin | H04R 1/406 |
| 2023/0134787 | A1 | 5/2023 | Chen et al. | |
| 2023/0396936 | A1* | 12/2023 | Ma | G01S 3/802 |
| 2024/0015436 | A1* | 1/2024 | Daniel | H04R 3/02 |

FOREIGN PATENT DOCUMENTS

| | | | |
|---|---|---|---|
| CN | 113784256 | A | 12/2021 |
| CN | 113873378 | A | 12/2021 |
| DE | 102020107620 | B3 | 7/2021 |
| EP | 4304201 | A1 | 1/2024 |

* cited by examiner

SOUND SIGNAL PROCESSING METHOD AND HEADSET DEVICE

CROSS-REFERENCE TO RELATED APPLICATIONS

This is a U.S. National Stage of International Application No. PCT/CN2023/071087 filed on Jan. 6, 2023, which claims priority to Chinese Patent application No. 202210193354.7, filed with China National Intellectual Property Administration on Feb. 28, 2022, both of which are incorporated herein by reference in their entireties.

TECHNICAL FIELD

This application relates to the field of electronic technologies, and in particular, to a sound signal processing method and a headset device.

BACKGROUND

As electronic technologies continuously develop, headset devices such as hearing aids, in-ear headsets, and over-ear headsets are increasingly popular among consumers.

Due to sealing between an earcap and an earmuff, a user hears a weakened external sound after wearing a headset device. Moreover, when a user speaks with a headset being worn, the user may perceive an increased strength of a low-frequency component in a voice signal of the user, which results in a blocking effect. In this case, a voice of the user is dull and unclear.

However, although current headset devices suppress the blocking effect, the headset devices cannot effectively restore an external sound signal.

SUMMARY

Embodiments of this application provide a sound signal processing method and a headset device, which can restore an external sound signal more effectively while suppressing a blocking effect.

In a first aspect, an embodiment of this application provides a headset device, including: an external microphone, an error microphone, a speaker, a feedforward filter, a feedback filter, a target filter, a first audio processing unit, and a second audio processing unit. The external microphone is configured to collect an external sound signal, where the external sound signal includes a first external environmental sound signal and a first voice signal. The error microphone is configured to collect an in-ear sound signal, where the in-ear sound signal includes a second external environmental sound signal, a second voice signal, and a blocking signal, a signal strength of the second external environmental sound signal is lower than a signal strength of the first external environmental sound signal, and a signal strength of the second voice signal is lower than a signal strength of the first voice signal. The feedforward filter is configured to process the external sound signal to obtain a to-be-compensated sound signal. The target filter is configured to process the external sound signal to obtain an environmental sound attenuation signal and a voice attenuation signal. The first audio processing unit is configured to remove the second external environmental sound signal and the second voice signal from the in-ear sound signal based on the environmental sound attenuation signal and the voice attenuation signal, to obtain the blocking signal. The feedback filter is configured to process the blocking signal to obtain an inverted noise signal. The second audio processing unit is configured to mix the to-be-compensated sound signal and the inverted noise signal, to obtain a mixed audio signal. The speaker is configured to play the mixed audio signal.

In this way, the target filter processes the external sound signal collected by the external microphone, to obtain the environmental sound attenuation signal and the voice attenuation signal. The first audio processing unit removes, based on the environmental sound attenuation signal and the voice attenuation signal, the second external environmental sound signal and the second voice signal from the in-ear sound signal collected by the error microphone, to obtain the blocking signal resulted from a blocking effect. The feedback filter generates the inverted noise signal corresponding to the blocking signal and plays the inverted noise signal through the speaker. Therefore, the feedback filter does not need to weaken the passively attenuated environmental sound signal and the passively attenuated voice signal in the in-ear sound signal. In this way; not only is the blocking effect suppressed, but a restoration degree of the first external environmental sound signal and the first voice signal sent by a user is improved.

In a possible implementation, the headset device further includes a vibration sensor and a first control unit. The vibration sensor is configured to collect a vibration signal during sound production of a user. The first control unit is configured to determine a target volume during sound production of the user based on one or more of the vibration signal, the external sound signal, and the in-ear sound signal, and obtain a corresponding feedback filter parameter based on the target volume. The feedback filter is specifically configured to process the blocking signal based on the feedback filter parameter determined by the first control unit, to obtain the inverted noise signal. In this way, the feedback filter parameter of the feedback filter is adaptively adjusted, that is, a deblocking effect of the feedback filter is adjusted based on a volume when the user speaks with a headset being worn, to improve deblocking effect consistency when the user speaks at different volumes with the headset being worn, thereby improving a hearthrough effect of the final external environmental sound signal and the voice signal sent by the user heard in an ear canal.

In a possible implementation, the first control unit is specifically configured to: determine a first volume based on an amplitude of the vibration signal: determine a second volume based on a signal strength of the external sound signal: determine a third volume based on a signal strength of the in-ear sound signal: and determine the target volume during sound production of the user based on the first volume, the second volume, and the third volume. In this way, the target volume during sound production of the user is determined based on the vibration signal, the external sound signal, and the in-ear sound signal, so that a more accurate feedback filter parameter can be finally determined.

In a possible implementation, the first control unit is specifically configured to calculate a weighted average of the first volume, the second volume, and the third volume, to obtain the target volume.

In a possible implementation, the headset device further includes a first control unit. The first control unit is configured to: obtain a first strength of a low-frequency component in the external sound signal and a second strength of a low-frequency component in the in-ear sound signal: and obtain a corresponding feedback filter parameter based on the first strength, the second strength, and a strength threshold. The feedback filter is specifically configured to process the blocking signal based on the feedback filter parameter determined by the first control unit, to obtain the inverted noise signal. Since the blocking signal is a low frequency rise signal resulted from a blocking effect when the user speaks, the feedback filter parameter may be accurately determined based on the low-frequency component in the external sound signal and the low-frequency component in the in-ear sound signal. Moreover, few hardware structures are added to the headset (for example, only the first control unit and the target filter are added), which simplifies the hardware structure in the headset.

In a possible implementation, the first control unit is specifically configured to: calculate an absolute value of a difference between the first strength and the second strength, to obtain a third strength: calculate a difference between the third strength and the strength threshold, to obtain a strength difference: and obtain the corresponding feedback filter parameter based on the strength difference. In this way; through comparison of the absolute value of the difference between the first strength of the low-frequency component in the external sound signal and the second strength of the low-frequency component in the in-ear sound signal with the strength threshold, a rising strength of the low-frequency component resulted from the blocking effect may be conveniently determined, which facilitates determination of the feedback filter parameter.

In a possible implementation, the headset device further includes an audio analysis unit and a third audio processing unit, the external microphone includes a reference microphone and a call microphone, and the feedforward filter includes a first feedforward filter and a second feedforward filter. The reference microphone is configured to collect a first external sound signal. The call microphone is configured to collect a second external sound signal. The audio analysis unit is configured to process the first external sound signal and the second external sound signal, to obtain the first external environmental sound signal and the first voice signal. The first feedforward filter is configured to process the first external environmental sound signal to obtain a to-be-compensated environmental signal. The second feedforward filter is configured to process the first voice signal to obtain a to-be-compensated voice signal, where the to-be-compensated sound signal includes the to-be-compensated environmental signal and the to-be-compensated voice signal. The third audio processing unit is configured to mix the first external environmental sound signal and the first voice signal, to obtain the external sound signal. In this way, based on the audio analysis unit, the first external environmental sound signal and the first voice signal can be accurately split from the external sound signal, so that the first feedforward filter can accurately obtain the to-be-compensated environmental signal, to improve accuracy of restoring the first external environmental sound signal, and the second feedforward filter can accurately obtain the to-be-compensated voice signal, to improve accuracy of restoring the first voice signal.

In a possible implementation, the headset device further includes a first control unit. The first control unit is configured to obtain the signal strength of the first external environmental sound signal and the signal strength of the first voice signal, and adjust an environmental sound filter parameter of the first feedforward filter and/or a voice filter parameter of the second feedforward filter based on the signal strength of the first external environmental sound signal and the signal strength of the first voice signal. The first feedforward filter is specifically configured to process the first external environmental sound signal based on the environmental sound filter parameter determined by the first control unit, to obtain the to-be-compensated environmental signal. The second feedforward filter is specifically configured to process the first voice signal based on the voice filter parameter determined by the first control unit, to obtain the to-be-compensated voice signal. In this way, through proper adjustment of the environmental sound filter parameter of the first feedforward filter and/or the voice filter parameter of the second feedforward filter, requirements in different scenarios can be satisfied.

In a possible implementation, the first control unit is specifically configured to: reduce the environmental sound filter parameter of the first feedforward filter when a difference between the signal strength of the first external environmental sound signal and the signal strength of the first voice signal is less than a first set threshold: and increase the voice filter parameter of the second feedforward filter when the difference between the signal strength of the first external environmental sound signal and the signal strength of the first voice signal is greater than a second set threshold. In this way, the first control unit may reduce the environmental sound filter parameter, to reduce the final environmental sound signal heard in the ear canal, thereby reducing negative hearing caused by background noise of circuits and microphone hardware. Moreover, the first control unit may further increase the voice filter parameter, so that the final voice signal in the ear canal is greater than the first voice signal in the external environment. In this way, the user can clearly hear the voice of the user in an environment with large noise.

In a possible implementation, the headset device further includes a wireless communication module and a first control unit. The wireless communication module is configured to receive a filter parameter sent by a terminal device, where the filter parameter includes one or more of an environmental sound filter parameter, a voice filter parameter, and a feedback filter parameter. The first control unit is configured to receive the filter parameter sent by the wireless communication module. In this way, a manner of controlling the environmental sound filter parameter, the voice filter parameter, and the feedback filter parameter in the headset through the terminal device is provided. In this case, the reference microphone, the call microphone, the error microphone, and the like may not be connected to the first control unit, thereby simplifying circuit connection in the headset. Moreover, the deblocking effect and the hearthrough effect of the headset may be manually controlled on the terminal device, which improves diversity of the deblocking effect and the transmission effect of the headset.

In a possible implementation, the headset device further includes a wireless communication module and a first control unit. The wireless communication module is configured to receive range information sent by a terminal device. The first control unit is configured to obtain a corresponding filter parameter based on the range information, where the filter parameter includes one or more of an environmental sound filter parameter, a voice filter parameter, and a feedback filter parameter. In this way, another manner of controlling the environmental sound filter parameter, the voice filter parameter, and the feedback filter parameter in the headset through the terminal device is provided. In this case, the reference microphone, the call microphone, the error microphone, and the like may not be connected to the first control unit, thereby simplifying circuit connection in the headset. Moreover, the deblocking effect and the hearthrough effect of the headset may be manually controlled on the terminal device, which improves diversity of the deblocking effect and the transmission effect of the headset.

In a possible implementation, the headset device further includes a wind noise analysis unit and a second control unit. The wind noise analysis unit is configured to calculate a correlation between the first external sound signal and the second external sound signal, to determine a strength of external environmental wind. The second control unit is configured to determine a target filter parameter of the target filter based on the strength of the external environmental wind. The target filter is further configured to process the external sound signal based on the target filter parameter determined by the second control unit, to obtain the environmental sound attenuation signal, where the external sound signal includes the first external sound signal and the second external sound signal. The first audio processing unit is further configured to remove a part of the in-ear sound signal based on the environmental sound attenuation signal, to obtain the blocking signal and an environmental noise signal. The feedback filter is further configured to process the blocking signal and the environmental noise signal to obtain the inverted noise signal. In this way, through adjustment of the target filter parameter of the target filter, final wind noise heard in the ear canal in a scenario with wind noise can be reduced.

In a second aspect, an embodiment of this application provides a sound signal processing method, which is applicable to a headset device. The headset device includes an external microphone, an error microphone, a speaker, a feedforward filter, a feedback filter, a target filter, a first audio processing unit, and a second audio processing unit. The method includes: The external microphone collects an external sound signal, where the external sound signal includes a first external environmental sound signal and a first voice signal. The error microphone collects an in-ear sound signal, where the in-ear sound signal includes a second external environmental sound signal, a second voice signal, and a blocking signal, a signal strength of the second external environmental sound signal is lower than a signal strength of the first external environmental sound signal, and a signal strength of the second voice signal is lower than a signal strength of the first voice signal. The feedforward filter processes the external sound signal to obtain a to-be-compensated sound signal. The target filter processes the external sound signal to obtain an environmental sound attenuation signal and a voice attenuation signal. The first audio processing unit removes the second external environmental sound signal and the second voice signal from the in-ear sound signal based on the environmental sound attenuation signal and the voice attenuation signal, to obtain the blocking signal. The feedback filter processes the blocking signal to obtain an inverted noise signal. The second audio processing unit mixes the to-be-compensated sound signal and the inverted noise signal, to obtain a mixed audio signal. The speaker plays the mixed audio signal.

In a possible implementation, the headset device further includes a vibration sensor and a first control unit. Before the feedback filter processes the blocking signal to obtain an inverted noise signal, the method further includes: The vibration sensor collects a vibration signal during sound production of a user. The first control unit determines a target volume during sound production of the user based on one or more of the vibration signal, the external sound signal, and the in-ear sound signal. The first control unit obtains a corresponding feedback filter parameter based on the target volume. That the feedback filter processes the blocking signal to obtain an inverted noise signal includes: The feedback filter processes the blocking signal based on the feedback filter parameter determined by the first control unit, to obtain the inverted noise signal.

In a possible implementation, that the first control unit determines a target volume during sound production of the user based on one or more of the vibration signal, the external sound signal, and the in-ear sound signal includes: The first control unit determines a first volume based on an amplitude of the vibration signal. The first control unit determines a second volume based on a signal strength of the external sound signal. The first control unit determines a third volume based on a signal strength of the in-ear sound signal. The first control unit determines the target volume during sound production of the user based on the first volume, the second volume, and the third volume.

In a possible implementation, that the first control unit determines the target volume during sound production of the user based on the first volume, the second volume, and the third volume includes: The first control unit calculates a weighted average of the first volume, the second volume, and the third volume, to obtain the target volume.

In a possible implementation, the headset device further includes a first control unit. Before the feedback filter processes the blocking signal to obtain an inverted noise signal, the method further includes: The first control unit obtains a first strength of a low-frequency component in the external sound signal and a second strength of a low-frequency component in the in-ear sound signal. The first control unit obtains a corresponding feedback filter parameter based on the first strength, the second strength, and a strength threshold. That the feedback filter processes the blocking signal to obtain an inverted noise signal includes: The feedback filter processes the blocking signal based on the feedback filter parameter determined by the first control unit, to obtain the inverted noise signal.

In a possible implementation, that the first control unit obtains a corresponding feedback filter parameter based on the first strength, the second strength, and a strength threshold includes: The first control unit calculates an absolute value of a difference between the first strength and the second strength, to obtain a third strength. The first control unit calculates a difference between the third strength and the strength threshold, to obtain a strength difference. The first control unit obtains the corresponding feedback filter parameter based on the strength difference.

In a possible implementation, the headset device further includes an audio analysis unit and a third audio processing unit, the external microphone includes a reference microphone and a call microphone, and the feedforward filter includes a first feedforward filter and a second feedforward filter. That the external microphone collects an external sound signal includes: collecting a first external sound signal through the reference microphone, and collecting a second external sound signal through the call microphone. That the feedforward filter processes the external sound signal to obtain a to-be-compensated sound signal includes: The audio analysis unit processes the first external sound signal and the second external sound signal, to obtain the first external environmental sound signal and the first voice signal. The first feedforward filter processes the first external environmental sound signal to obtain a to-be-compensated environmental signal. The second feedforward filter processes the first voice signal to obtain a to-be-compensated voice signal, where the to-be-compensated sound signal includes the to-be-compensated environmental signal and the to-be-compensated voice signal. Before the target filter processes the external sound signal to obtain an environmental sound attenuation signal and a voice attenuation signal, the method further includes: The third audio processing unit mixes the first external environmental sound signal and the first voice signal, to obtain the external sound signal.

In a possible implementation, the headset device further includes a first control unit. Before the first feedforward filter processes the first external environmental sound signal to obtain a to-be-compensated environmental signal, the method further includes: The first control unit obtains the signal strength of the first external environmental sound signal and the signal strength of the first voice signal. The first control unit adjusts an environmental sound filter parameter of the first feedforward filter and/or a voice filter parameter of the second feedforward filter based on the signal strength of the first external environmental sound signal and the signal strength of the first voice signal. That the first feedforward filter processes the first external environmental sound signal to obtain a to-be-compensated environmental signal includes: The first feedforward filter processes the first external environmental sound signal based on the environmental sound filter parameter determined by the first control unit, to obtain the to-be-compensated environmental signal. That the second feedforward filter processes the first voice signal to obtain a to-be-compensated voice signal includes: The second feedforward filter processes the first voice signal based on the voice filter parameter determined by the first control unit, to obtain the to-be-compensated voice signal.

In a possible implementation, that the first control unit adjusts an environmental sound filter parameter of the first feedforward filter and/or a voice filter parameter of the second feedforward filter based on the signal strength of the first external environmental sound signal and the signal strength of the first voice signal includes: The first control unit reduces the environmental sound filter parameter of the first feedforward filter when a difference between the signal strength of the first external environmental sound signal and the signal strength of the first voice signal is less than a first set threshold. The first control unit increases the voice filter parameter of the second feedforward filter when the difference between the signal strength of the first external environmental sound signal and the signal strength of the first voice signal is greater than a second set threshold.

In a possible implementation, the headset device further includes a wireless communication module and a first control unit. Before the first feedforward filter processes the first external environmental sound signal to obtain a to-be-compensated environmental signal, the method further includes: The wireless communication module receives a filter parameter sent by a terminal device, where the filter parameter includes one or more of an environmental sound filter parameter, a voice filter parameter, and a feedback filter parameter. The first control unit receives the filter parameter sent by the wireless communication module.

In a possible implementation, the headset device further includes a wireless communication module and a first control unit. Before the first feedforward filter processes the first external environmental sound signal to obtain a to-be-compensated environmental signal, the method further includes: The wireless communication module receives range information sent by a terminal device. The first control unit obtains a corresponding filter parameter based on the range information, where the filter parameter includes one or more of an environmental sound filter parameter, a voice filter parameter, and a feedback filter parameter.

In a possible implementation, the headset device further includes a wind noise analysis unit and a second control unit. The method further includes: The wind noise analysis unit calculates a correlation between the first external sound signal and the second external sound signal, to determine a strength of external environmental wind. The second control unit determines a target filter parameter of the target filter based on the strength of the external environmental wind. The target filter processes the external sound signal based on the target filter parameter determined by the second control unit, to obtain the environmental sound attenuation signal, where the external sound signal includes the first external sound signal and the second external sound signal. The first audio processing unit removes a part of the in-ear sound signal based on the environmental sound attenuation signal, to obtain the blocking signal and an environmental noise signal. The feedback filter processes the blocking signal and the environmental noise signal to obtain the inverted noise signal.

Effects of possible implementations of the second aspect are similar to the effects of the first aspect and the possible designs of the first aspect, and therefore are not described in detail herein.

DESCRIPTION OF EMBODIMENTS

For ease of describing the technical solutions in embodiments of this application clearly, in embodiments of this application, words such as "first" and "second" are used for distinguishing between same or similar items with a basically same function and role. For example, a first chip and a second chip are merely used for distinguishing between different chips, and are not intended to limit a sequence thereof. A person skilled in the art may understand that the words such as "first" and "second" do not limit a quantity and an execution order, and the words such as "first" and "second" unnecessarily define a difference.

It should be noted that in embodiments of this application, words such as "as an example" or "for example" represent giving an example, an illustration, or a description. Any embodiment or design solution described as "as an example" or "for example" in embodiments of this application should not be explained as being more preferred or having more advantages than another embodiment or design solution. Exactly, use of the words such as "as an example" or "for example" is intended to present a concept in a specific manner.

In embodiments of this application, "at least one" means one or more, and "a plurality of" means two or more. "And/or" describes an association relationship between associated objects and indicates that three relationships may exist. For example, A and/or B may represent the following cases: only A exists, both A and B exist, and only B exists, where A and B may be singular or plural. The character "/" generally indicates that the associated objects are in an "or" relationship. "At least one of the following items" or a similar expression thereof indicates any combination of these items, including a single item or any combination of a plurality of items. For example, at least one of a, b, or c may represent: a, b, c, a-b, a-c, b-c, or a-b-c, where a, b, and c may be single or multiple.

As electronic technologies continuously develop, headset devices are increasingly popular among consumers. A headset device in embodiments of this application may be a headset, or may be a device that needs to be inserted into an ear such as a hearing aid or a diagnostic device. In embodiments of this application, the headset device is a headset, for example. The headset may also be referred to as an earplug, an earphone, a walkman, an audio player, a media player, a headphone, a receiver device, or some other suitable term.

Figure 1:
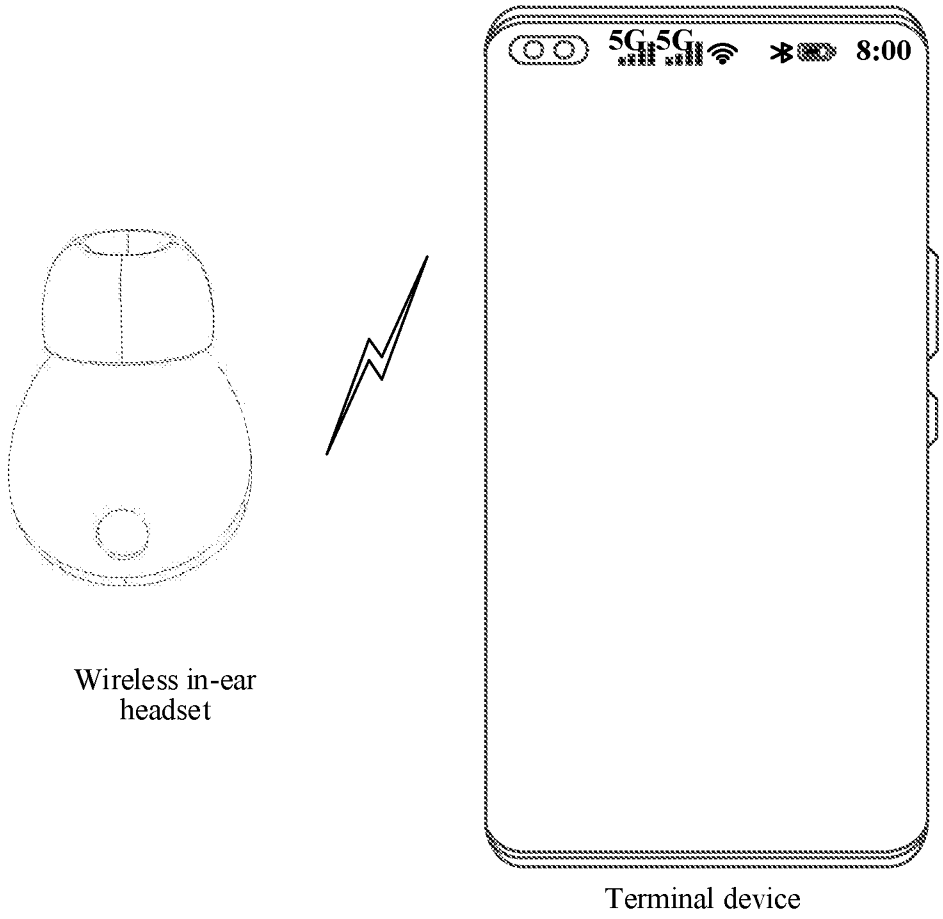
FIG. 1 is a schematic diagram of a system architecture according to an embodiment of this application.

Refer to FIG. 1. FIG. 1 is a schematic diagram of a system architecture according to an embodiment of this application. The system architecture includes a terminal device and a headset, and communication connection may be established between the headset and the terminal device.

The headset may be a wireless in-ear headset. From a perspective of a manner of communication between the headset and the terminal device, the wireless in-ear headset is a wireless headset. The wireless headset is a headset that may be wirelessly connected to a terminal device. Wireless headsets may be further classified into the following based on an electromagnetic wave frequency used by wireless headsets: infrared wireless headsets, meter wave wireless headsets (such as FM frequency modulation headsets), decimeter wave wireless headsets (such as Bluetooth headsets), and the like. From a perspective a headset wearing manner, the wireless in-ear headset is an in-ear type headset.

It may be understood that the headset in this embodiment of this application may also be a headset of another type. As an example, from the perspective of the manner of communication between the headset and the terminal device, the headset in this embodiment of this application may also be a wired headset. The wired headset is a wired headset that may be connected to the terminal device through a wire (such as a cable). Wired headsets may be classified into cylindrical cable headsets, noodle cable headsets, and the like based on a cable shape. From the perspective of a headset wearing manner, the headset may also be a semi in-ear headset, an earmuff headset (also referred to as an over-ear headset), an ear-mounted headset, a neck-mounted headset, or the like.

Figure 2:
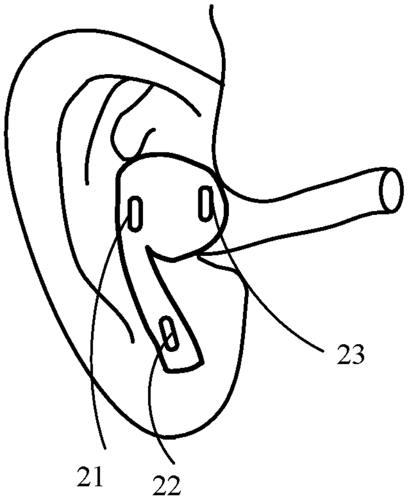
FIG. 2 is a schematic diagram of a scenario in which a user wears a headset according to an embodiment of this application.

Refer to FIG. 2. FIG. 2 is a schematic diagram of a scenario in which a user wears a headset according to an embodiment of this application. The headset may include a reference microphone 21, a call microphone 22, and an error microphone 23.

When the user normally wears the headset, the reference microphone 21 and the call microphone 22 are usually arranged on a side of the headset away from the ear canal, that is, on an outer side of the headset. In this case, the reference microphone 21 and the call microphone 22 may be collectively referred to as an external microphone. The reference microphone 21 and the call microphone 22 are configured to collect external sound signals. The reference microphone 21 is mainly configured to collect an external environmental sound signal, and the call microphone 22 is mainly configured to collect a voice signal transmitted through the air when the user speaks, for example, a speech sound in a call scenario.

When the user normally wears the headset, the error microphone 23 is usually arranged on a side of the headset near an ear canal, that is, on an inner side of the headset, and is configured to collect an in-ear sound signal in the ear canal of the user. In this case, the error microphone 23 may be referred to as an in-ear microphone.

It may be understood that, in some products, the microphone in the headset may include one or more of the reference microphone 21, the call microphone 22, and the error microphone 23. For example, the microphone in the headset may include only the call microphone 22 and the error microphone 23. Moreover, one or more reference microphones 21 may be arranged, one or more call microphones 22 may be arranged, and one or more error microphones 23 may be arranged.

Generally, a headset does not fit perfectly with an ear canal. Therefore, a gap exists between the headset and the ear canal. After a user wears the headset, an external sound signal enters the ear canal through the gap. However, due to sealing between an earcap and an earmuff of the headset, an eardrum of the user may be isolated from the external sound signal. Therefore, even though the external sound signal enters the ear canal through the gap between the headset and the ear canal, the external sound signal entering the ear canal is still subject to high-frequency component attenuation due to the wearing of the headset. In other words, a loss occurs on the external sound signal entering the ear canal, resulting in a decrease in an amount of external sound heard by the user. For example, when the user speaks with the headset being worn, the external sound signal includes the environmental sound signal and the voice signal when the user speaks.

Moreover, after the user wears the headset, an acoustic cavity in the ear canal changes from an open field to a pressure field. In this case, when the user speaks with the headset being worn, the user may perceive an increased strength of a low-frequency component in the voice signal of the user, which results in a blocking effect. In this case, a voice of the user is dull and unclear. This reduces smoothness of communication between the user and another user.

In other words, when the user speaks with the headset being worn, a low-frequency component of the in-ear sound signal rises while a high-frequency component of the in-ear sound signal attenuates. A degree of the rise in the low-frequency component and a degree of the attenuation in the high-frequency component may be shown in FIG. 3.

Figure 3:
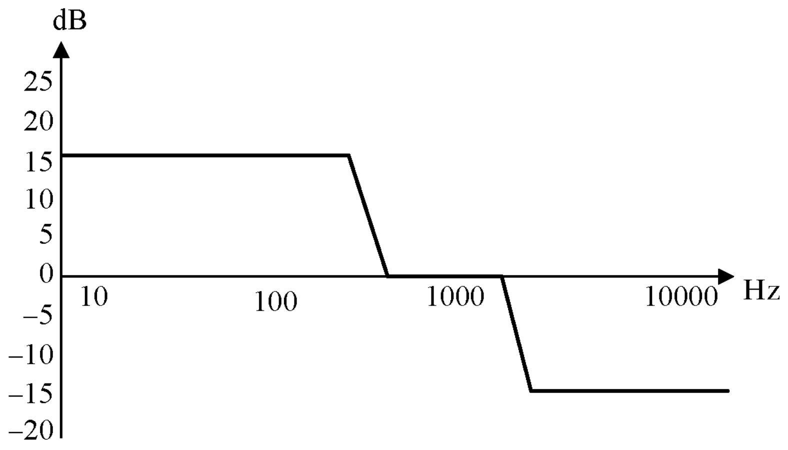
FIG. 3 is a schematic diagram of low frequency rise and high frequency attenuation of an in-ear sound signal when a user speaks with a headset being worn according to an embodiment of this application.

FIG. 3 is a schematic diagram of low frequency rise and high frequency attenuation of an in-ear sound signal when a user speaks with a headset being worn according to an embodiment of this application. A horizontal axis represents a frequency of the in-ear sound signal in a unit of Hz, and a vertical axis represents a strength difference between the in-ear sound signal and an external sound signal in a unit of dB (decibel).

It may be learned that, due to a blocking effect, a low-frequency component of the in-ear sound signal rises, with a rising strength of about 15 dB. Due to blocking of the headset, the external sound signal entering an ear canal is subject to high-frequency component attenuation as result of the wearing of the headset, with an attenuation strength of about −15 dB.

It should be noted that, during sound transmission of the headset, bone conduction energy causes a lower jawbone and soft tissues near an outer ear canal to vibrate, which causes a cartilage wall of the ear canal to vibrate. The generated energy is then transferred to an air volume inside the ear canal. When the ear canal is blocked, most of the energy is trapped, which leads to an increased level of sound pressure transmitted to an eardrum and ultimately to a cochlea, resulting in a blocking effect.

In a related art, a speaker in the headset separates an inner cavity of a housing into a front cavity and a rear cavity. The front cavity is a part of the inner cavity having a sound outlet, and the rear cavity is a part of the inner cavity facing away from the sound outlet. A leakage hole is arranged on the housing of the front cavity or the rear cavity in the headset. An amount of leakage from the front cavity or the rear cavity may be adjusted through the leakage hole, so that low-frequency component may leak to some extent when the user wears the headset, to suppress the blocking effect.

However, the arrangement of the leakage hole occupies a part of the space of the headset, and causes some low-frequency losses. For example, during playback of music by using the headset, a loss may occur to output performance of low-frequency music, and the blocking effect cannot be effectively alleviated.

Figure 4:
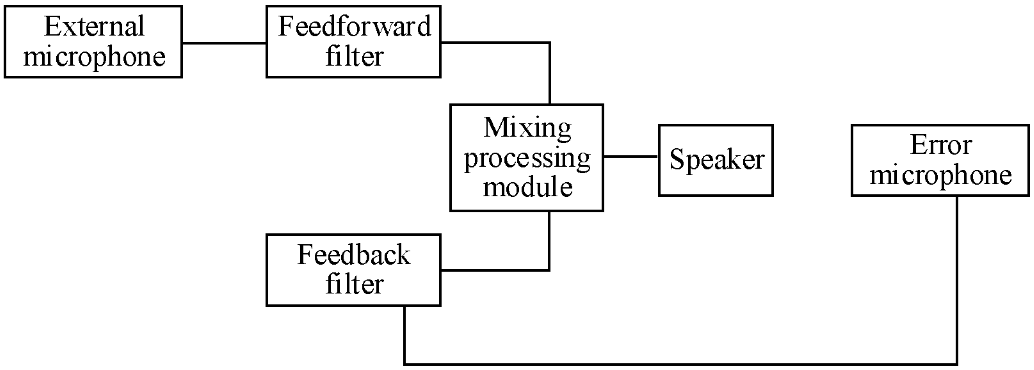
FIG. 4 is a schematic structural diagram of a headset in the related art.

In another related art, the blocking effect may be suppressed through active noise cancellation (active noise cancellation, ANC) by using an error microphone. Refer to FIG. 4. The headset may be an active noise reduction headset, which includes an external microphone, a feedforward filter, an error microphone, a feedback filter, a mixing processing module, and a speaker. The external microphone may be a reference microphone or a call microphone.

An external sound signal is collected through the external microphone, and a loss of the external sound signal resulted from the wearing of the headset is compensated through the feedforward filter. In other words, the external sound signal collected by the external microphone is processed by the feedforward filter to obtain a to-be-compensated sound signal, and the to-be-compensated sound signal is played through the speaker. Through combination of the to-be-compensated sound signal with the external sound signal leaked into the ear canal through the gap between the headset and the ear canal, restoration of the external sound signal can be realized. In other words, hearthrough (hearthrough, HT) transmission of the external sound signal to the ear canal of the user can be realized, thereby realizing feeling of an external sound like that without wearing of the headset.

After the user wears the headset, the external sound signal entering the ear canal of user is subject to high-frequency component attenuation as a result of the wearing of the headset. For example, if the high-frequency component is greater than or equal to 800 Hz, a high-frequency component loss above 800 Hz resulted from the wearing of the headset is compensated through the feedforward filter. Since the external sound signal entering the ear canal has little low-frequency component attenuation resulted from the wearing of the headset, the low-frequency component loss may not be compensated through the feedforward filter.

The error microphone collects the in-ear sound signal in the ear canal of the user. When the user speaks, the in-ear sound signal includes a passively attenuated environmental sound signal H1, a passively attenuated voice signal H2, and an additional low-frequency H3 generated in a coupling cavity between the front mouth of the headset and the ear canal resulted from skull vibration. H3 is low-frequency rise signal of the voice signal resulted from the blocking effect, which may be referred to as a blocking signal. The in-ear sound signal collected by the error microphone may be processed by the feedback filter to obtain an inverted noise signal, and the inverted noise signal may be played through the speaker to suppress the blocking effect.

It should be noted that, after the feedforward filter obtains the to-be-compensated sound signal and the feedback filter obtains the inverted noise signal, the mixing processing module mixes the to-be-compensated sound signal and the inverted noise signal to obtain a mixed audio signal, and transmits the mixed audio signal to the speaker for playback.

The passively attenuated environmental sound signal H1 is a signal obtained after the environmental sound signal entering the ear canal attenuates as a result of the wearing of the headset, that is, an environmental sound signal obtained after the external environmental sound signal is passively denoised as a result of the wearing of the headset. The passively attenuated voice signal H2 is a signal obtained after the voice signal entering the ear canal attenuates as a result of the wearing of the headset, that is, a voice signal obtained after the signal sent by the user is passively denoised as a result of the wearing of the headset.

However, the in-ear sound signal includes the passively attenuated environmental sound signal H1, the passively attenuated voice signal H2, and the blocking signal H3. Therefore, when processing the in-ear sound signal, the feedback filter not only weakens or even eliminates the blocking signal H3, but also weakens the passively attenuated environmental sound signal H1 and the passively attenuated voice signal H2, so that the passively attenuated environmental sound signal H1 and the passively attenuated voice signal H2 are also weakened to some extent.

Although the external environmental sound signal and the voice signal sent by the user may be compensated through the feedforward filter, and the to-be-compensated sound signal may be played through the speaker, to realize restoration of the external sound signal, since the feedback filter further weakens a part of the passively attenuated environmental sound signal H1 and a part of the passively attenuated voice signal H2 when processing the in-ear sound signal, the final environmental sound signal and voice signal in the ear canal weaken, which means that the external environmental sound signal and the voice signal sent by the user cannot be effectively restored.

Based on the above, an embodiment of this application provides a sound signal processing method and a headset device. A target filter and a first audio processing unit are added to a headset. The target filter processes an external sound signal collected by an external microphone, to obtain an environmental sound attenuation signal and a voice attenuation signal. The first audio processing unit removes, based on the environmental sound attenuation signal and the voice attenuation signal obtained through processing by the target filter, a passively attenuated environmental sound signal and a passively attenuated voice signal from an in-ear sound signal collected by an error microphone, to obtain a blocking signal resulted from a blocking effect, and transmits the blocking signal to a feedback filter. The feedback filter may generate an inverted noise signal corresponding to the blocking signal, and plays the inverted noise signal through a speaker. In other words, the feedback filter does not need to weaken the passively attenuated environmental sound signal and the passively attenuated voice signal in the in-ear sound signal. In this way, not only is the blocking effect suppressed, but a restoration degree of the first external environmental sound signal and the first voice signal sent by a user is improved.

Figure 5:
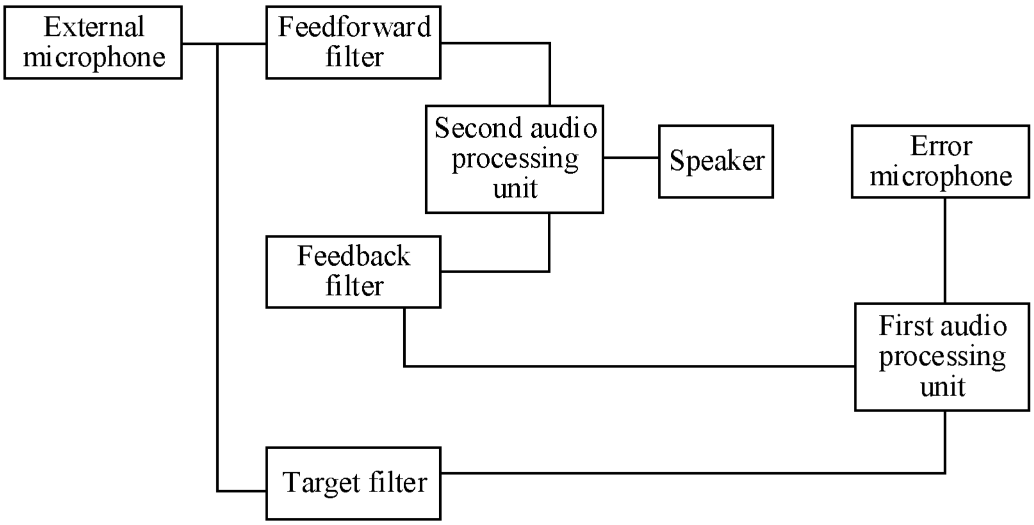
FIG. 5 is a schematic structural diagram of a first type of headset according to an embodiment of this application.

As an example, FIG. 5 is a schematic structural diagram of a first type of headset according to an embodiment of this application. As shown in FIG. 5, the headset includes an external microphone, an error microphone, a feedforward filter, a feedback filter, a target filter, a first audio processing unit, a second audio processing unit, and a speaker.

The external microphone is connected to the feedforward filter and the target filter. The error microphone and the target filter are both connected to the first audio processing unit. The first audio processing unit is connected to the feedback filter. The feedback filter and the feedforward filter are both connected to the second audio processing unit. The second audio processing unit is connected to the speaker.

The external microphone may be a reference microphone or a call microphone, which is configured to collect an external sound signal. When a user speaks with the headset being worn, the external sound signal collected by the external microphone includes a first external environmental sound signal and a first voice signal sent by the user.

The feedforward filter is configured to compensate for a loss of the external sound signal resulted from the wearing of the headset. The external sound signal collected by the external microphone is processed by the feedforward filter to obtain a to-be-compensated sound signal. Through combination of the to-be-compensated sound signal with the external sound signal leaked into an ear canal through a gap between the headset and the ear canal, restoration of the external sound signal can be realized. The external sound signal leaking into the ear canal through the gap between the headset and the ear canal is referred to as a passively attenuated external sound signal, which includes the passively attenuated environmental sound signal and the passively attenuated voice signal.

The error microphone is configured to collect an in-ear sound signal. When the user speaks, the in-ear sound signal includes a passively attenuated environmental sound signal $H_1$, a passively attenuated voice signal $H_2$, and a blocking signal $H_3$ generated in a coupling cavity between a front mouth of the headset and the ear canal resulted from skull vibration. The passively attenuated environmental sound signal $H_1$ may be referred to as a second external environmental sound signal, which is an environmental sound signal leaking into the ear canal through the gap between the headset and the ear canal. The passively attenuated voice signal $H_2$ may be referred to as a second voice signal, which is a voice signal leaking into the ear canal through the gap between the headset and the ear canal.

Since the external sound signal entering the ear canal is subject to high-frequency component attenuation as result of the wearing of the headset after the user wears the headset, a signal strength of the second external environmental sound signal in the in-ear sound signal is lower than a signal strength of the first external environmental sound signal in the external sound signal, and a signal strength of the second voice signal in the in-ear sound signal is lower than a signal strength of the first voice signal in the external sound signal.

The target filter is configured to process the external sound signal to obtain an environmental sound attenuation signal and a voice attenuation signal. The environmental sound attenuation signal is a signal obtained after the first external environmental sound signal in the external sound signal is actively denoised through the target filter. The voice attenuation signal is a signal obtained after the first voice signal in the external sound signal is actively denoised through the target filter.

In some embodiments, the environmental sound attenuation signal and the second external environmental sound signal in the in-ear sound signal are signals with similar amplitudes and same phases, and the voice attenuation signal and the second voice signal in the in-ear sound signal are signals with similar amplitudes and same phases. Optionally, the environmental sound attenuation signal and the second external environmental sound signal have equal amplitudes and same phases, and the voice attenuation signal and the second voice signal have equal amplitudes and same phases.

The first audio processing unit is configured to remove, based on the environmental sound attenuation signal and the voice attenuation signal obtained through processing by the target filter, the second external environmental sound signal and the second voice signal from the in-ear sound signal collected by the error microphone, to obtain the blocking signal.

The feedback filter is configured to process the blocking signal to obtain an inverted noise signal. The inverted noise signal is a signal having an amplitude similar to and a phase opposite to those of the blocking signal. For example, in some embodiments, the inverted noise signal and the blocking signal have equal amplitudes and opposite phases.

The second audio processing unit is configured to mix the to-be-compensated sound signal and the inverted noise signal, to obtain a mixed audio signal. The mixed audio signal includes the to-be-compensated sound signal and the inverted noise signal.

The speaker is configured to play the mixed audio signal.

Since the mixed audio signal played by the speaker includes the to-be-compensated sound signal and the inverted noise signal, the to-be-compensated sound signal may be combined with the environmental sound signal and the voice signal leaking into the ear canal through the gap between the headset and the ear canal, to realize restoration of the external sound signal. The inverted noise signal can weaken or offset the low-frequency rise signal in the ear canal resulted from the blocking signal, to suppress the blocking effect during speaking with the headset being worn. Therefore, through the headset in this embodiment of this application, not only is the blocking effect suppressed, but a restoration degree of the first external environmental sound signal and the first voice signal sent by the user is improved.

It may be understood that the microphone in this embodiment of this application is an apparatus configured to collect sound signals, and the speaker is an apparatus configured to play sound signals.

The microphone may also be referred to as a voice tube, an earphone, a pickup, a receiver, a sound-conducting apparatus, a sound sensor, a sound sensitive sensor, an audio acquisition apparatus, or some other appropriate term. In this embodiment of this application, the microphone is used as an example to describe the technical solution. The speaker, also referred to as a "horn", is configured to convert an electrical audio signal into a sound signal. In this embodiment of this application, the speaker is used as an example to describe the technical solution.

It may be understood that the headset shown in FIG. 5 is merely an example provided in this embodiment of this application. During specific implementation of this application, the headset may have more or fewer components than shown, or may combine two or more components, or may have different component configurations. It should be noted that, in an optional case, the above components of the headset may also be coupled together.

Figure 6:
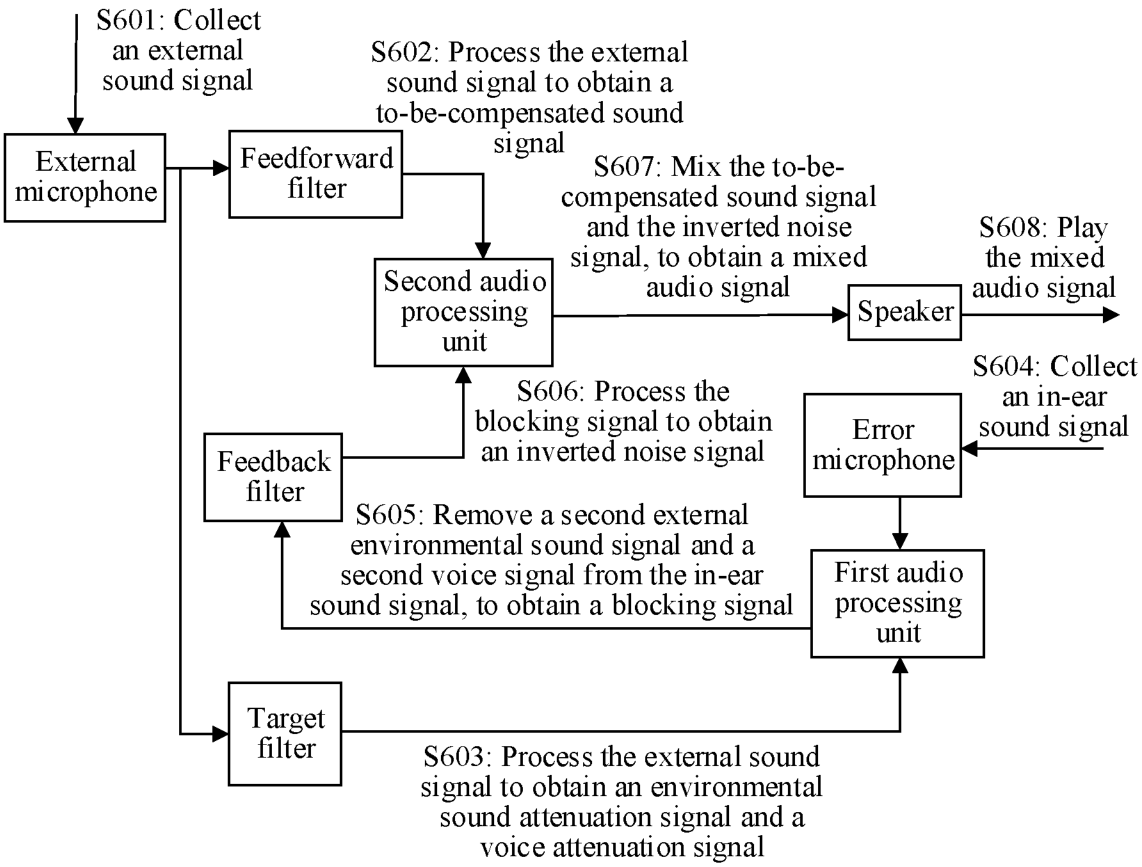
FIG. 6 is a schematic flowchart of a first sound signal processing method according to an embodiment of this application.

Based on the structural diagram of the headset shown in FIG. 5, a sound signal processing method provided in an embodiment of this application is described below: FIG. 6 is a schematic flowchart of a first sound signal processing method according to an embodiment of this application. The method is applicable to the headset shown in FIG. 5, and the headset is being worn by a user. The method may specifically include the following steps:

S601: The external microphone collects an external sound signal.

When a user speaks with the headset being worn, the external sound signal collected by the external microphone includes a first external environmental sound signal and a first voice signal sent by the user. The external microphone may be a reference microphone or a call microphone. The external microphone is an analog signal.

S602: The feedforward filter processes the external sound signal to obtain a to-be-compensated sound signal.

In some embodiments, a first analog-to-digital conversion unit (not shown) may be arranged between the external microphone and the feedforward filter. An input terminal of the first analog-to-digital conversion unit is connected to the external microphone, and an output terminal of the first analog-to-digital conversion unit is connected to the feedforward filter.

Since the external sound signal collected by the external microphone is an analog signal, the external microphone transmits the external sound signal to the first analog-to-digital conversion unit after collecting the external sound signal. The first analog-to-digital conversion unit performs analog-to-digital conversion on the external sound signal to convert the analog signal to a digital signal, and transmits the external sound signal after the analog-to-digital conversion to the feedforward filter for processing.

A feedforward filter parameter is preset in the feedforward filter. The feedforward filter parameter may be referred to as an FF parameter. The feedforward filter filters the external sound signal after the analog-to-digital conversion based on the preset feedforward filter parameter, to obtain the to-be-compensated sound signal. After obtaining the to-be-compensated sound signal, the feedforward filter may transmit the to-be-compensated sound signal to the second audio processing unit.

S603: The target filter processes the external sound signal to obtain an environmental sound attenuation signal and a voice attenuation signal.

In some embodiments, the output terminal of the first analog-to-digital conversion unit may be further connected to the target filter. After performing analog-to-digital conversion on the external sound signal, the first analog-to-digital conversion unit may transmit the external sound signal after the analog-to-digital conversion to the target filter for processing.

A target filter parameter is preset in the target filter. Based on the set target filter parameter, the target filter filters the external sound signal after the analog-to-digital conversion to obtain the environmental sound attenuation signal and the voice attenuation signal.

In a possible implementation, the target filter may map the external sound signal as a passively attenuated environmental sound signal $H_1$ and a passively attenuated voice signal $H_2$. The passively attenuated environmental sound signal $H_1$ and the passively attenuated voice signal $H_2$ may be collectively referred to as a passively attenuated signal HE_pnc.

In a case, the target filter parameter may be a proportional coefficient, which is a positive number greater than 0 and less than 1. The target filter calculates a product of the external sound signal and the proportional coefficient to obtain the environmental sound attenuation signal and the voice attenuation signal.

In another case, the target filter parameter may be an attenuation parameter, which is a positive number. The target filter calculates a difference between the external sound signal and the attenuation parameter to obtain the environmental sound attenuation signal and the voice attenuation signal.

After obtaining the environmental sound attenuation signal and the voice attenuation signal, the target filter may transmit the environmental sound attenuation signal and the voice attenuation signal to the first audio processing unit for processing.

S604: The error microphone collects an in-ear sound signal.

When the user speaks with the headset being worn, the in-ear sound signal collected by the error microphone includes a second external environmental sound signal, a second voice signal, and a blocking signal. The second external environmental sound signal is the passively attenuated environmental sound signal $H_1$, and the second voice signal is the passively attenuated voice signal $H_2$.

S605: The first audio processing unit removes a second external environmental sound signal and a second voice signal from the in-ear sound signal, to obtain a blocking signal.

In some embodiments, a second analog-to-digital conversion unit (not shown) may be arranged between the error microphone and the first audio processing unit, an input terminal of the second analog-to-digital conversion unit is connected to the error microphone, and an output terminal of the second analog-to-digital conversion unit is connected to the first audio processing unit.

Since the in-ear sound signal collected by the error microphone is an analog signal, the error microphone transmits the in-ear sound signal to the second analog-to-digital conversion unit after collecting the in-ear sound signal. The second analog-to-digital conversion unit performs analog-to-digital conversion on the in-ear sound signal to convert the analog signal to a digital signal, and transmits the in-ear sound signal after the analog-to-digital conversion to the first audio processing unit for processing.

In this case, the first audio processing unit may receive the environmental sound attenuation signal and the voice attenuation signal transmitted by the target filter, and the first audio processing unit may further receive the in-ear sound signal. Then, the first audio processing unit processes the environmental sound attenuation signal and the voice attenuation signal obtained through processing by the target filter, to obtain an inverted attenuation signal. The inverted attenuation signal has an amplitude similar to and a phase opposite to those of a signal obtained through mixing of the environmental sound attenuation signal and the voice attenuation signal. Next, the first audio processing unit mixes the inverted attenuation signal with the in-ear sound signal, that is, removes the second external environmental sound signal and the second voice signal from the in-ear sound signal, to obtain the blocking signal.

S606: The feedback filter processes the blocking signal to obtain an inverted noise signal.

After obtaining the blocking signal, the first audio processing unit transmits the blocking signal to the feedback filter. A feedback filter parameter is preset in the feedback filter. The feedback filter parameter may be referred to as an FB parameter. The feedback filter processes the blocking signal based on the preset feedback filter parameter to obtain the inverted noise signal, and transmits the inverted noise signal to the second audio processing unit. The inverted noise signal has an amplitude similar to and a phase opposite to those of the blocking signal.

S607: The second audio processing unit mixes the to-be-compensated sound signal and the inverted noise signal, to obtain a mixed audio signal.

After receiving the to-be-compensated sound signal transmitted by the feedforward filter and the inverted noise signal transmitted by the feedback filter, the second audio processing unit mixes the to-be-compensated sound signal and the inverted noise signal to obtain the mixed audio signal. The mixed audio signal includes the to-be-compensated sound signal and the inverted noise signal.

S608: The speaker plays the mixed audio signal.

In some embodiments, a digital-to-analog conversion unit (not shown) may be arranged between the second audio processing unit and the speaker, an input terminal of the digital-to-analog conversion unit is connected to the second audio processing unit, and an output terminal of the digital-to-analog conversion unit is connected to the speaker.

Since the mixed audio signal obtained through processing by the second audio processing unit is a digital signal, the second audio processing unit transmits the mixed audio signal to the digital-to-analog conversion unit after obtaining the mixed audio signal through processing. The digital-to-analog conversion unit performs digital-to-analog conversion on the mixed audio signal, to convert the digital signal into an analog signal, and transmits the mixed audio signal after the analog-to-digital conversion to the speaker. The speaker plays the mixed audio signal after the digital-to-analog conversion, which not only reduces noise in the blocking signal (that is, suppresses the blocking effect), but also improves a restoration degree of the first external environmental sound signal and the first voice signal sent by the user. In other words, the external sound signal can be transmitted to the ear canal of the user without a need to adjust the feedforward filter parameter of the feedforward filter, thereby realizing feeling of an external sound like that without wearing of the headset.

In some embodiments, the feedback filter parameter, the feedforward filter parameter, and the target filter parameter may be obtained through pre-testing.

Figure 7:
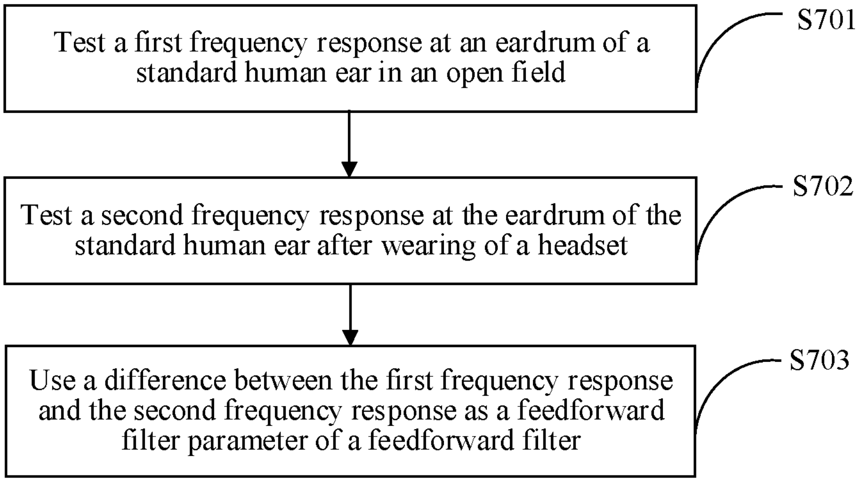
FIG. 7 is a schematic diagram of a testing process for obtaining a feedforward filter parameter of a feedforward filter through testing according to an embodiment of this application.

FIG. 7 is a schematic diagram of a testing process for obtaining a feedforward filter parameter of a feedforward filter through testing according to an embodiment of this application. With reference to FIG. 7, the process may include the following steps:

S701: Test a first frequency response at an eardrum of a standard human ear in an open field.

It may be understood that the open field is a scenario in which a tester wears no headset, and the standard human ear may be understood as an ear of the tester with normal hearing. The frequency response, also referred to as a frequency response, is a response degree of a system to different frequencies.

S702: Test a second frequency response at the eardrum of the standard human ear after wearing of a headset.

S703: Use a difference between the first frequency response and the second frequency response as the feedforward filter parameter of the feedforward filter.

The tester tests the first frequency response FR1 at the eardrum before wearing the headset. The tester tests the second frequency response FR2 at the eardrum after wearing the headset. After the wearing of the headset, an external sound signal entering the ear canal through a gap between the headset and the ear canal is subject to high-frequency component attenuation as a result of blocking of the headset. Therefore, the difference between the first frequency response FR1 and the second frequency response FR2 may be determined as the feedforward filter parameter of the feedforward filter.

During testing of the feedback filter parameter of the feedback filter, one ear (for example, a left ear) of the tester may wear the headset, and the other ear (for example, a right ear) may not wear the headset. The tester reads a paragraph of text at a fixed and steady volume, and continuously adjusts the filter parameter of the feedback filter until sounds heard by the left ear and the right ear are consistent. The filter parameter is determined as the feedback filter parameter. When the adjusted feedback filter parameter of the feedback filter causes the sounds heard by the left ear and the right ear to be consistent, additional low-frequency rise resulted from a blocking effect can be offset.

Generally, before the adjustment of the feedback filter parameter of the feedback filter, the sounds heard by the left ear and the right ear differ greatly. With continuous adjustment of the feedback filter parameter of the feedback filter, the sounds heard by the left ear and the right ear tend to be consistent.

During actual testing, feedback filter parameters of the feedback filter corresponding to different volumes may be tested. For example, feedback filter parameters corresponding to the feedback filter at volumes such as 60 dB, 70 dB, and 80 dB are tested. During the testing, a volume of the sound produced by the tester may be measured at a distance of 20 cm from a mouth by using a sound meter.

Figure 8:
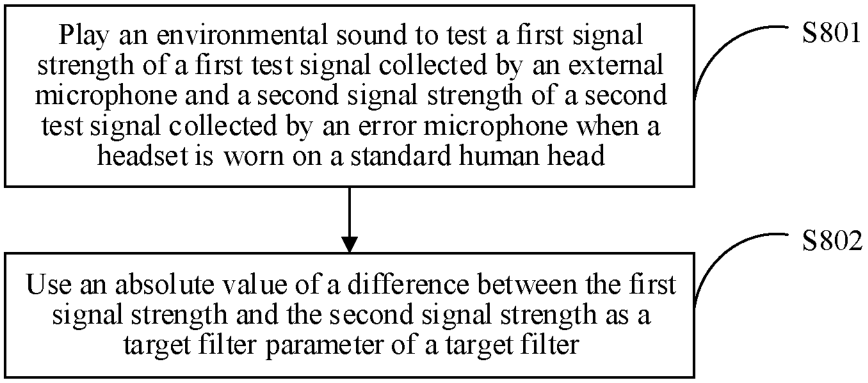
FIG. 8 is a schematic diagram of a testing process for obtaining a target filter parameter of a target filter through testing according to an embodiment of this application.

FIG. 8 is a schematic diagram of a testing process for obtaining a target filter parameter of a target filter through testing according to an embodiment of this application. With reference to FIG. 8, the process may include the following steps:

S801: Play an environmental sound to test a first signal strength of a first test signal collected by an external microphone and a second signal strength of a second test signal collected by an error microphone when a headset is worn on a standard human head.

S802: Use an absolute value of a difference between the first signal strength and the second signal strength as the target filter parameter of the target filter.

If the first signal strength of the first test signal collected by the external microphone is S1 and the second signal strength of the second test signal collected by the error microphone is S2 after a tester wears a headset, the target filter parameter of the target filter is |S1−S2|. In this case, the target filter parameter may be an attenuation parameter.

Therefore, when a user subsequently speaks with the headset being worn, the target filter may calculate a difference between an external sound signal collected by the external microphone and the target filter parameter, to obtain an environmental sound attenuation signal and a voice attenuation signal, so that a final signal obtained through processing by a first audio processing unit includes only a blocking signal, thereby preventing a feedback filter from performing additional attenuation on the external sound signal.

Figure 9:
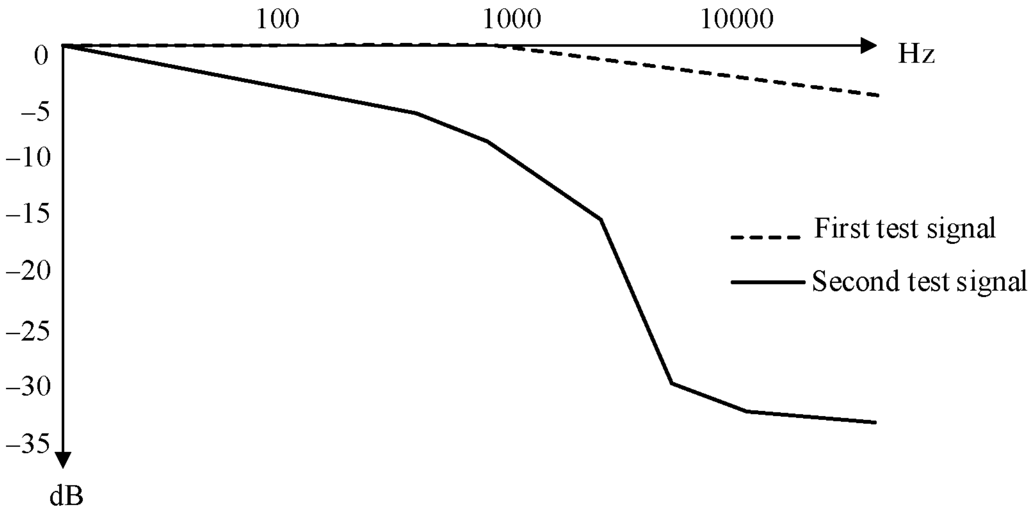
FIG. 9 is a schematic diagram of a first test signal collected by an external microphone and a second test signal collected by an error microphone obtained through testing according to an embodiment of this application.

FIG. 9 is a schematic diagram showing the first test signal and the second test signal obtained through testing. A horizontal axis represents frequencies of the first test signal and the second test signal in a unit of Hz, and a vertical axis represents signal strengths of the first test signal and the second test signal in a unit of dB (decibel). A difference between the first test signal and the second test signal in the vertical axis direction may be understood as the target filter parameter of the target filter.

In some other embodiments, if the first signal strength of the first test signal collected by the external microphone is S1 and the second signal strength of the second test signal collected by the error microphone is S2 after the tester wears the headset, a ratio of the second signal strength to the first signal strength may be determined as the target filter parameter of the target filter, that is, the target filter parameter of the target filter=S2/S1. In this case, the target filter parameter may be a proportional coefficient, which is a positive number greater than 0 and less than 1.

Therefore, when a user subsequently speaks with the headset being worn, the target filter may calculate a product of the external sound signal collected by the external microphone and the target filter parameter, to obtain an environmental sound attenuation signal and a voice attenuation signal, so that a final signal obtained through processing by a first audio processing unit includes only a blocking signal, thereby preventing a feedback filter from performing additional attenuation on the external sound signal.

Figure 10:
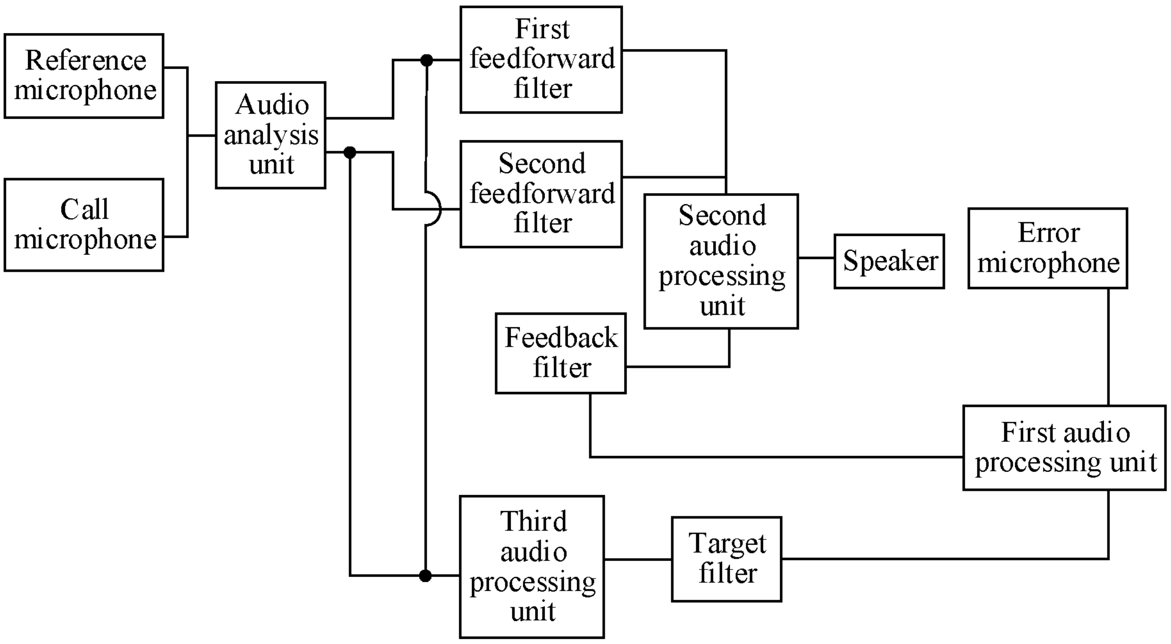
FIG. 10 is a schematic structural diagram of a second type of headset according to an embodiment of this application.

As an example, FIG. 10 is a schematic structural diagram of a second type of headset according to an embodiment of this application. As shown in FIG. 10, the headset includes a reference microphone, a call microphone, an error microphone, an audio analysis unit, a first feedforward filter, a second feedforward filter, a feedback filter, a target filter, a first audio processing unit, a second audio processing unit, a third audio processing unit, and a speaker.

A difference between the headset shown in FIG. 10 and the headset shown in FIG. 5 is that the headset shown in FIG. 5 has only one external microphone and only one feedforward filter arranged therein, while the headset shown in FIG. 10 have two external microphones and two feedforward filters arranged therein. The two external microphones are respectively the reference microphone and the call microphone, and the two feedforward filters are respectively the first feedforward filter and the second feedforward filter. In addition, the headset shown in FIG. 10 further includes the audio analysis unit and the third audio processing unit.

The reference microphone and the call microphone are both connected to the audio analysis unit. The audio analysis unit is further connected to the first feedforward filter, the second feedforward filter, and the third audio processing unit. The third audio unit is connected to the target filter. The error microphone and the target filter are both connected to the first audio processing unit. The first audio processing unit is further connected to the feedback filter. The feedback filter, the first feedforward filter, and the second feedforward filter are all connected to the second audio processing unit. The second audio processing unit is further connected to the speaker.

An external sound signal is jointly collected through the reference microphone and the call microphone. The first external sound signal collected by the reference microphone includes an external environmental sound signal and a voice signal sent by a user, and the second external sound signal collected by the call microphone also includes an external environmental sound signal and a voice signal sent by the user. However, since a distance between the call microphone and a mouth of the user is less than a distance between the reference microphone and the mouth of the user when the user normally wears the headset, the first external sound signal may be different from the second external sound signal. For example, the second external sound signal collected by the call microphone includes more voice signals than the first external sound signal collected by the reference microphone.

The audio analysis unit is configured to split the first external sound signal collected by the reference microphone and the second external sound signal collected by the call microphone, to obtain the first external environmental sound signal and the first voice signal sent by the user.

The first feedforward filter may be configured to compensate for a loss of the external environmental sound signal resulted from the wearing of the headset. After the audio analysis unit obtains the first external environmental sound signal through splitting, the first external environmental sound signal is processed by the first feedforward filter to obtain a to-be-compensated environmental signal. Through combination of the to-be-compensated environmental signal and an external environmental sound signal leaking into an ear canal through a gap between the headset and the ear canal (that is, a passively attenuated environmental sound signal), restoration of the first external environmental sound signal can be realized.

The second feedforward filter may be configured to compensate for a loss of the voice signal sent by the user resulted from the wearing of the headset. After the audio analysis unit obtains the first voice signal sent by the user through splitting, the first voice signal is processed through the second feedforward filter to obtain a to-be-compensated voice signal. Through combination of the to-be-compensated voice signal and a voice signal leaking into the ear canal through the gap between the headset and the ear canal (that is, a passively attenuated voice signal), restoration of the first voice signal sent by the user can be realized.

The error microphone is configured to collect an in-ear sound signal. In a scenario in which the user speaks, the in-ear sound signal includes a second external environmental sound signal, a second voice signal, and a blocking signal.

The third audio processing unit is configured to mix the first external environmental sound signal obtained by the audio analysis unit through processing and the first voice signal sent by the user, to obtain the external sound signal. The external sound signal includes the first external environmental sound signal and the first voice signal sent by the user.

The target filter is configured to process the external sound signal to obtain an environmental sound attenuation signal and a voice attenuation signal.

The first audio processing unit is configured to remove, based on the environmental sound attenuation signal and the voice attenuation signal obtained through processing by the target filter, the second external environmental sound signal and the second voice signal from the in-ear sound signal collected by the error microphone, to obtain the blocking signal.

The feedback filter is configured to process the blocking signal to obtain an inverted noise signal. The inverted noise signal is a signal having an amplitude similar to and a phase opposite to those of the blocking signal.

The second audio processing unit is configured to mix the to-be-compensated environmental signal, the to-be-compensated voice signal, and the inverted noise signal, to obtain a mixed audio signal. The mixed audio signal includes the to-be-compensated voice signal, the to-be-compensated voice signal, and the inverted noise signal.

The speaker is configured to play the mixed audio signal.

Since the mixed audio signal played by the speaker includes the to-be-compensated voice signal, the to-be-compensated voice signal, and the inverted noise signal. The to-be-compensated voice signal is combined with the environmental sound signal leaking into the ear canal through the gap between the headset and the ear canal, to realize restoration of the first external environmental sound signal, and the to-be-compensated voice signal is combined with the voice signal leaking into the ear canal through the gap between the headset and the ear canal, to realize restoration of the first voice signal sent by the user, thereby realizing restoration of the external sound signal. The inverted noise signal can weaken or offset the low-frequency rise signal in the ear canal resulted from the blocking signal, to suppress the blocking effect during speaking with the headset being worn. Therefore, through the headset in this embodiment of this application, not only is the blocking effect suppressed, but a restoration degree of the first external environmental sound signal and the first voice signal sent by the user is improved.

It may be understood that the headset shown in FIG. 10 is merely an example provided in this embodiment of this application. During specific implementation of this application, the headset may have more or fewer components than shown, or may combine two or more components, or may have different component configurations. It should be noted that, in an optional case, the above components of the headset may also be coupled together.

Figure 11:
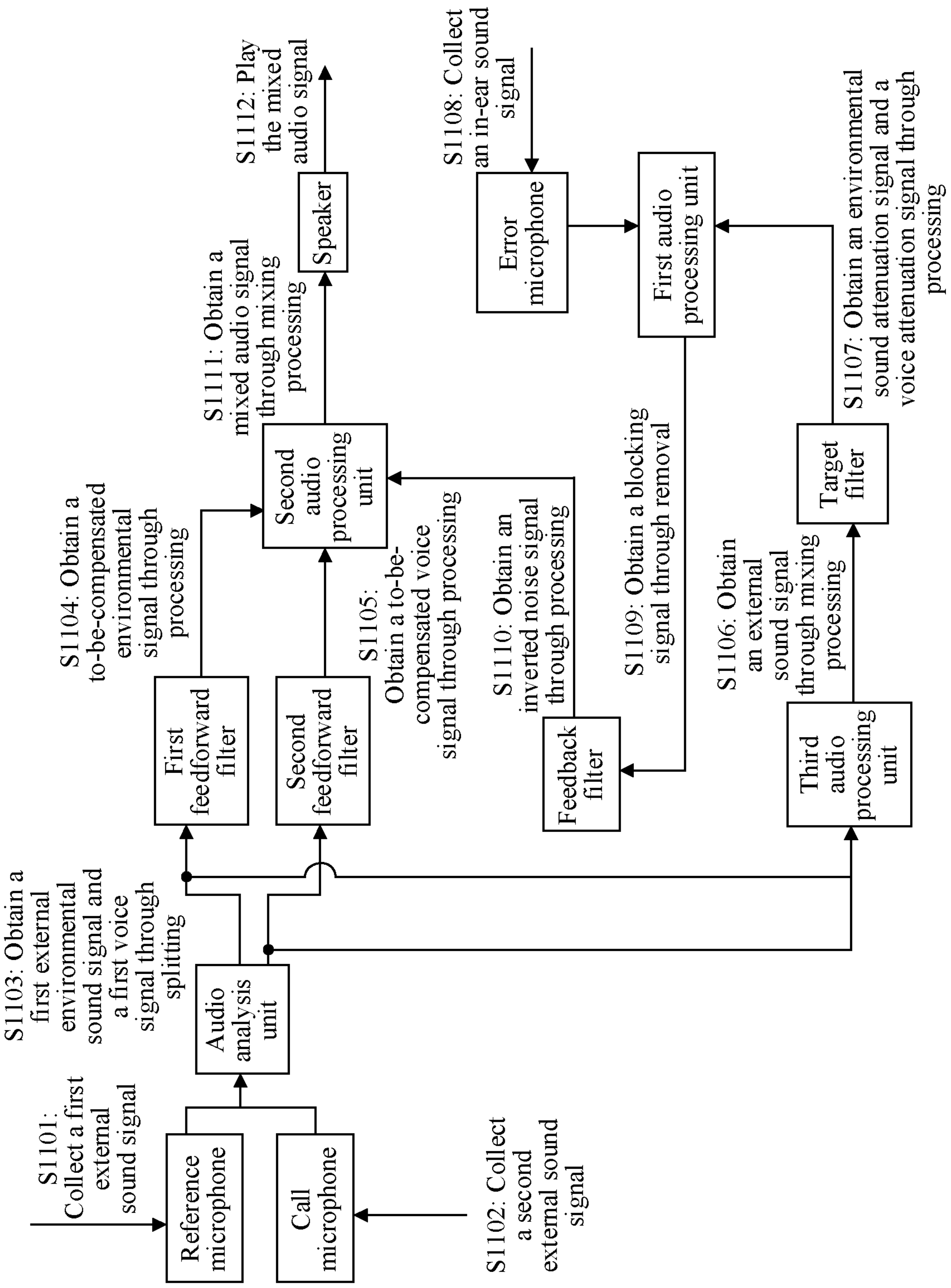
FIG. 11 is a schematic flowchart of a second sound signal processing method according to an embodiment of this application.

Based on the structural diagram of the headset shown in FIG. 10, a sound signal processing method provided in an embodiment of this application is described below: FIG. 11 is a schematic flowchart of a second sound signal processing method according to an embodiment of this application. The method is applicable to the headset shown in FIG. 10, and the headset is being worn by a user. The method may specifically include the following steps:

S1101: The reference microphone collects a first external sound signal.

S1102: The call microphone collects a second external sound signal.

The headset has the reference microphone and the call microphone arranged therein, both of which are configured to collect external sound signals. The external sound signal collected by the reference microphone is referred to as the first external sound signal, and the external sound signal collected by the call microphone is referred to as the second external sound signal.

S1103: The audio analysis unit splits the first external sound signal and the second external sound signal, to obtain a first external environmental sound signal and a first voice signal.

Since the external environmental sound signals in the first external sound signal and the second external sound signal are different, and the voice signals in the first external sound signal and the second external sound signal sent by a user are also different, the audio analysis unit may analyze the first external sound signal and the second external sound signal, to obtain the first external environmental sound signal and the first voice signal by splitting the first external sound signal and the second external sound signal.

S1104: The first feedforward filter processes the first external environmental sound signal to obtain a to-be-compensated environmental signal.

In some embodiments, a third analog-to-digital conversion unit (not shown) may be arranged between the audio analysis unit and the first feedforward filter. An input terminal of the third analog-to-digital conversion unit is connected to the audio analysis unit, and an output terminal of the third analog-to-digital conversion unit is connected to the first feedforward filter.

Since the first external sound signal collected by the reference microphone and the second external sound signal collected by the call microphone are both analog signals, the first external environmental sound signal obtained by the audio analysis unit by splitting the first external sound signal and the second external sound signal is also an analog signal.

After obtaining the first external environmental sound signal through splitting, the audio analysis unit transmits the first external environmental sound signal to the third analog-to-digital conversion unit. The third analog-to-digital conversion unit performs analog-to-digital conversion on the first external environmental sound signal, to convert the analog signal into a digital signal, and transmits the first external environmental sound signal after the analog-to-digital conversion to the first feedforward filter for processing.

An environmental sound filter parameter is preset in the first feedforward filter. Based on the set environmental sound filter parameter, the first feedforward filter filters the first external environmental sound signal after the analog-to-digital conversion, to obtain a to-be-compensated environmental signal, and transmits the to-be-compensated environmental signal to the second audio processing unit.

S1105: The second feedforward filter processes the first voice signal to obtain a to-be-compensated voice signal.

In some embodiments, a fourth analog-to-digital conversion unit (not shown) may be arranged between the audio analysis unit and the second feedforward filter. An input terminal of the fourth analog-to-digital conversion unit is connected to the audio analysis unit, and an output terminal of the fourth analog-to-digital conversion unit is connected to the second feedforward filter.

Since the first external sound signal collected by the reference microphone and the second external sound signal collected by the call microphone are both analog signals, the first voice signal obtained by the audio analysis unit by splitting the first external sound signal and the second external sound signal is also an analog signal.

After obtaining the first voice signal through splitting, the audio analysis unit transmits the first voice signal to the fourth analog-to-digital conversion unit. The fourth analog-to-digital conversion unit performs analog-to-digital conversion on the first voice signal, to convert the analog signal into a digital signal, and transmits the first voice signal after the analog-to-digital conversion to the second feedforward filter for processing.

A voice filter parameter is preset in the second feedforward filter. Based on the set voice filter parameter, the second feedforward filter filters the first voice signal after the analog-to-digital conversion, to obtain a to-be-compensated voice signal, and transmits the to-be-compensated voice signal to the second audio processing unit.

S1106: The third audio processing unit mixes the first external environmental sound signal and the first voice signal, to obtain the external sound signal.

In some embodiments, the output terminals of the third analog-to-digital conversion unit and the fourth analog-to-digital conversion unit may be further connected to the third audio processing unit. The third analog-to-digital conversion unit may transmit the first external environmental sound signal after the analog-to-digital conversion to the third audio processing unit, and the fourth analog-to-digital conversion unit may transmit the first voice signal after the analog-to-digital conversion to the third audio processing unit.

The third audio processing unit may mix the first external environmental sound signal after the analog-to-digital conversion and the first voice signal after the analog-to-digital conversion, to obtain the external sound signal, and transmit the external sound signal to the target filter for processing. The external sound signal includes the first external environmental sound signal and the first voice signal sent by the user.

S1107: The target filter processes the external sound signal to obtain an environmental sound attenuation signal and a voice attenuation signal.

S1108: The error microphone collects an in-ear sound signal.

S1109: The first audio processing unit removes a second external environmental sound signal and a second voice signal from the in-ear sound signal, to obtain a blocking signal.

S1110: The feedback filter processes the blocking signal to obtain an inverted noise signal.

It should be noted that, principles of S1107 to S1110 are similar to those of S603 to S606, and therefore are not described in detail herein to avoid repetition.

S1111: The second audio processing unit mixes the to-be-compensated environmental signal, the to-be-compensated voice signal, and the inverted noise signal, to obtain a mixed audio signal.

After receiving the to-be-compensated environmental signal transmitted by the first feedforward filter, the to-be-compensated voice signal transmitted by the second feedforward filter, and the inverted noise signal transmitted by the feedback filter, the second audio processing unit mixes the to-be-compensated environmental signal, the to-be-compensated voice signal, and the inverted noise signal, to obtain the mixed audio signal. The mixed audio signal includes the to-be-compensated environmental signal, the to-be-compensated voice signal, and the inverted noise signal.

S1112: The speaker plays the mixed audio signal.

It should be noted that, principles of S1112 are similar to those of S608, and therefore are not described in detail herein to avoid repetition.

Therefore, when the speaker plays the mixed audio signal, not only is noise reduction of the blocking signal realized (that is, a blocking effect is suppressed), but a restoration degree of the first external environmental sound signal and the first voice signal sent by the user is improved.

In a possible scenario, sound production strengths when different users speak with a headset being worn may be different, wearing positions of a headset when the same user wears the headset a plurality of times may be different, and sound production strengths when the same user wears a headset a plurality of times may be different, resulting in different degrees of low-frequency component rising of the in-ear sound signal when the user speaks with the headset being worn. In other words, blocking signals resulted from the blocking effect have different strengths.

Figure 12:
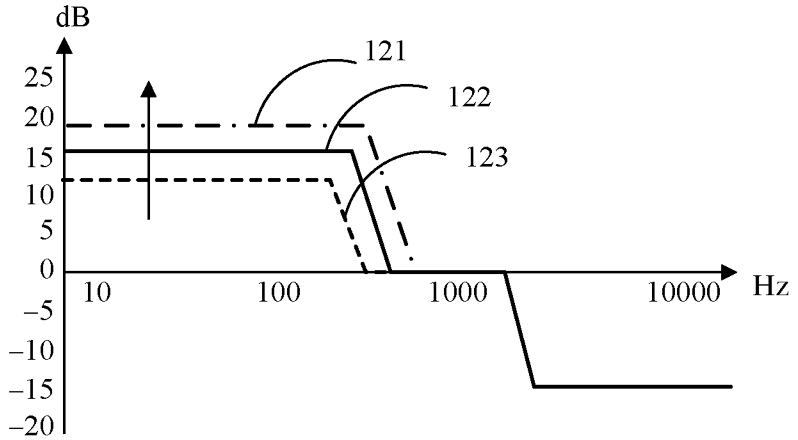
FIG. 12 is a schematic diagram of low frequency rise and high frequency attenuation of an in-ear sound signal resulted from different volumes of a voice signal when a user speaks with a headset being worn according to an embodiment of this application.

Refer to FIG. 12. FIG. 12 is a schematic diagram of low frequency rise and high frequency attenuation of an in-ear sound signal resulted from different volumes of a voice signal when a user speaks with a headset being worn according to an embodiment of this application. A horizontal axis represents a frequency of the in-ear sound signal in a unit of Hz, and a vertical axis represents a strength difference between the in-ear sound signal and an external sound signal in a unit of dB (decibel). In a direction indicated by an arrow, low-frequency component rising strengths corresponding to different volumes are shown. In the direction indicated by the arrow, volumes corresponding to line segments increase successively.

For example, a volume corresponding to a first line segment 121 is greater than a volume corresponding to a second line segment 122, and the volume corresponding to the second line segment 122 is greater than a volume corresponding to a third line segment 123. It may be learned that a low-frequency component rising strength corresponding to the first line segment 121 is about 20 dB, a low-frequency component rising strength corresponding to the second line segment 122 is about 15 dB, and a low-frequency component rising strength corresponding to the third line segment 123 is about 12 dB. In other words, the low-frequency component rising strength corresponding to the first line segment 121 is greater than the low-frequency component rising strength corresponding to the second line segment 122, and the low-frequency component rising strength corresponding to corresponding to the second line segment 122 is greater than the low-frequency component rising strength corresponding to the third line segment 123.

It may be learned that, due to the blocking effect, a low-frequency component of the in-ear sound signal rises. Moreover, when the user speaks at different volumes, different low-frequency component rising degrees are resulted from the blocking effect, and a volume is positively correlated with the low-frequency component rising degree. In other words, a larger volume indicates a larger low-frequency component rising degree, and a smaller volume indicates a smaller low-frequency component rising degree.

If the feedback filter uses a fixed feedback filter parameter to process the blocking signal to obtain an inverted noise signal so as to suppress the blocking effect, when a strength of a blocking signal resulted from a volume of the first voice signal sent by the user is less than a strength of a blocking signal for which the feedback filter parameter can achieve a deblocking effect, excessive deblocking occurs, resulting in a loss of a low-frequency component in a final voice signal heard in the ear canal. When the strength of the blocking signal resulted from the volume of the first voice signal sent by the user is greater than the strength of the blocking signal for which the feedback filter parameter can achieve a deblocking effect, insufficient deblocking occurs, resulting excessive low-frequency components in the final voice signal heard in the ear canal.

Therefore, in this embodiment of this application, the feedback filter parameter of the feedback filter may be further adaptively adjusted. In other words, a deblocking effect of the feedback filter may be adjusted based on the volume when the user speaks with the headset being worn, to improve deblocking effect consistency when the user speaks at different volumes with the headset being worn, thereby improving a hearthrough effect of the final external environmental sound signal and the voice signal sent by the user heard in the ear canal. For a specific implementation, refer to the following description.

Figure 13:
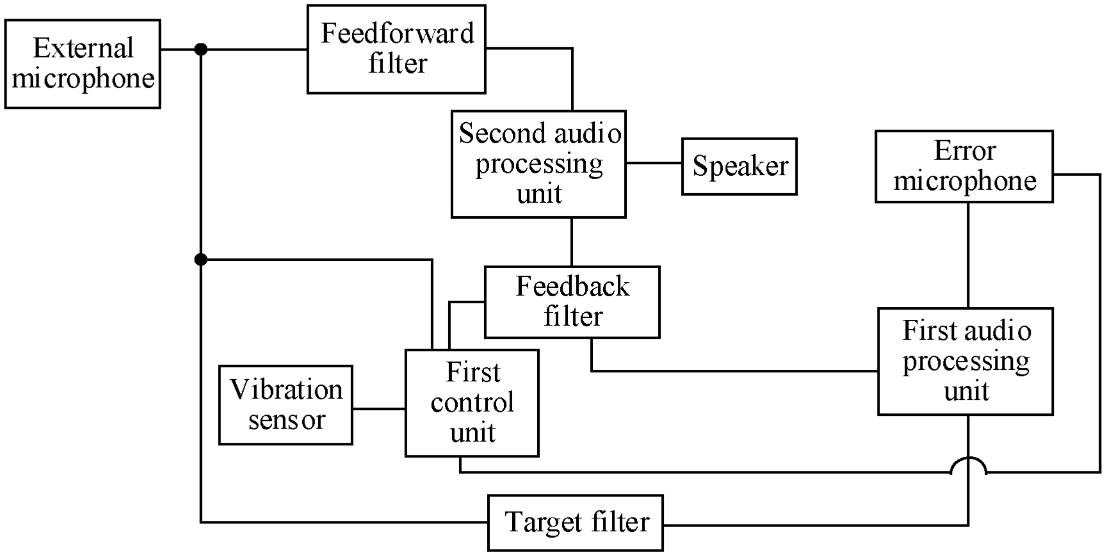
FIG. 13 is a schematic structural diagram of a third type of headset according to an embodiment of this application.

As an example, FIG. 13 is a schematic structural diagram of a third type of headset according to an embodiment of this application. As shown in FIG. 13, the headset includes an external microphone, an error microphone, a feedforward filter, a feedback filter, a target filter, a first audio processing unit, a second audio processing unit, a vibration sensor, a first control unit, and a speaker.

A difference between the headset shown in FIG. 13 and the headset shown in FIG. 5 is that the headset shown in FIG. 13 further has the vibration sensor and the first control unit based on the headset shown in FIG. 5.

The external microphone is connected to the feedforward filter. The target filter, and the first control unit. The error microphone is connected to the first audio processing unit and the first control unit. The target filter is connected to the first audio processing unit. The first audio processing unit is further connected to the feedback filter. The vibration sensor is connected to the first control unit. The first control unit is connected to the feedback filter. The feedback filter and the feedforward filter are both connected to the second audio processing unit. The second audio processing unit is further connected to the speaker.

The external microphone may be a reference microphone or a call microphone, which is configured to collect an external sound signal. The error microphone is configured to collect an in-ear sound signal. The vibration sensor is configured to collect a vibration signal when a user speaks with a headset being worn.

The first control unit is configured to determine, based on the vibration signal collected by the vibration sensor, the external sound signal collected by the external microphone, and the in-ear sound signal collected by the error microphone, a target volume, that is, strength of vibration generated by coupling between an earcap and an ear canal when the user speaks with the headset being worn. Moreover, the first control unit may search a prestored comparison table of relationship between a volume and a feedback filter parameter of a feedback filter for a feedback filter parameter matching the target volume, and transmit the feedback filter parameter to the feedback filter, so that the feedback filter processes a blocking signal transmitted by the first audio processing unit based on the feedback filter parameter transmitted by the first control unit, to obtain an inverted noise signal.

It should be noted that, for detailed descriptions of the feedforward filter, the target filter, the first audio processing unit, the second audio processing unit, and the speaker, refer to the descriptions corresponding to the headset shown in FIG. 5. To avoid repetition, the details are not described herein.

It may be understood that the headset shown in FIG. 13 is merely an example provided in this embodiment of this application. During specific implementation of this application, the headset may have more or fewer components than shown, or may combine two or more components, or may have different component configurations. It should be noted that, in an optional case, the above components of the headset may also be coupled together.

Figure 14:
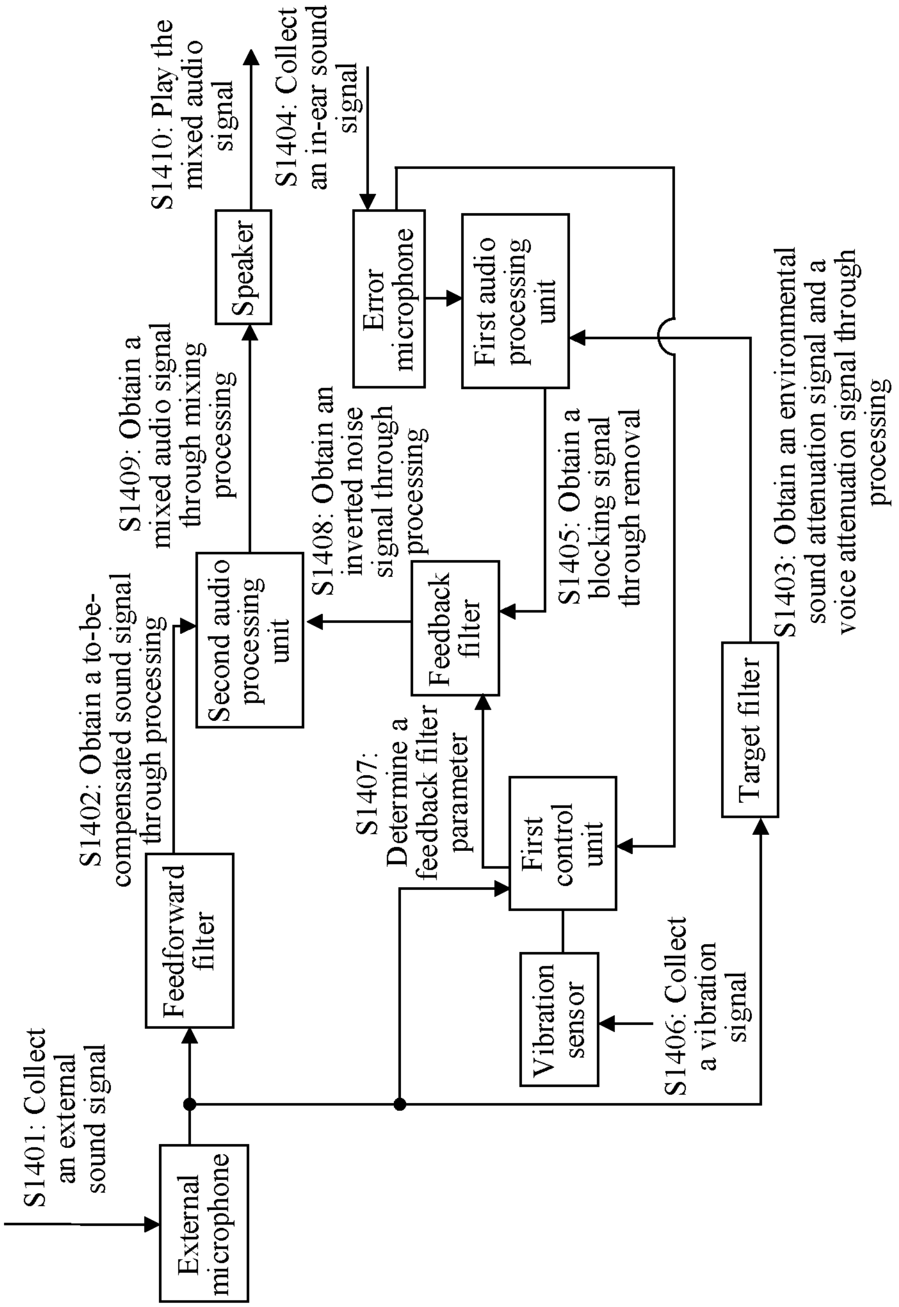
FIG. 14 is a schematic flowchart of a third sound signal processing method according to an embodiment of this application.

Based on the structural diagram of the headset shown in FIG. 13, a sound signal processing method provided in an embodiment of this application is described below. FIG. 14 is a schematic flowchart of a fourth sound signal processing method according to an embodiment of this application. The method is applicable to the headset shown in FIG. 13, and the headset is being worn by a user. The method may specifically include the following steps:

S1401: The external microphone collects an external sound signal.

S1402: The feedforward filter processes the external sound signal to obtain a to-be-compensated sound signal.

S1403: The target filter processes the external sound signal to obtain an environmental sound attenuation signal and a voice attenuation signal.

S1404: The error microphone collects an in-ear sound signal.

S1405: The first audio processing unit removes a second external environmental sound signal and a second voice signal from the in-ear sound signal, to obtain a blocking signal.

It should be noted that, principles of S1401 to S1405 are similar to those of S601 to S605, and therefore are not described in detail herein to avoid repetition.

S1406: The vibration sensor collects a vibration signal.

Vibration is generated when the user speaks with the headset being worn. Therefore, the vibration sensor collects a vibration signal produced when the user speaks with the headset being worn, that is, collects a vibration signal when sound is being produced by the user wearing the headset. The vibration signal is related to a volume during speech of the user.

S1407: The first control unit determines a target volume based on the vibration signal, the external sound signal, and the in-ear sound signal, and finds a feedback filter parameter based on the target volume.

The first control unit may receive the vibration signal transmitted by the vibration sensor, the external sound signal transmitted by the external microphone, and the in-ear sound signal transmitted by the error microphone. The external sound signal includes a first voice signal when the user speaks. In this case, the volume during speech of the user may be determined based on the external sound signal collected by the external microphone. The in-ear sound signal collected by the error microphone includes a second voice signal, which may reflect the first voice signal when the user speaks to a specific extent. In other words, a stronger first voice signal indicates a stronger second voice signal. In this case, the volume during speech of the user may be determined based on the in-ear sound signal collected by the error microphone.

In some embodiments, a larger volume during speech of the user indicates a larger amplitude of the vibration signal collected by the vibration sensor increases. A comparison table of relationship between an amplitude of a vibration signal and a volume is prestored in the first control unit. After receiving the vibration signal transmitted by the vibration sensor, the first control unit may obtain the amplitude of the vibration signal, and search the comparison table of relationship between an amplitude and a volume for a corresponding volume. The found volume is referred to as a first volume.

Moreover, a larger volume during speech of the user indicates a larger strength of the external sound signal collected by the external microphone and a larger strength of the in-ear sound signal collected by the error microphone. In this case, the first control unit may determine a second volume during speech of the user based on the external sound signal and determine a third volume during speech of the user based on the in-ear sound signal.

The first control unit determines the target volume during speech of the users based on the first volume, the second volume, and the third volume. The target volume may be a weighted average of the first volume, the second volume, and the third volume. Weights corresponding to the first volume, the second volume, and the third volume may be equal or unequal.

Certainly, in some embodiments, the target volume during speech of the user may also be determined based on any one or two of the vibration signal, the external sound signal, and the in-ear sound signal.

In a case, the target volume during speech of the user may be determined through the external sound signal collected by the external microphone and the vibration signal collected by the vibration sensor. To improve accuracy of the target volume, the call microphone may serve as the external microphone. The first control unit determines the target volume during speech of the user wearing the headset based on the vibration signal and the external sound signal. In this case, the error microphone may not be connected to the first control unit.

In another case, the target volume during speech of the user may be determined through only the in-ear sound signal collected by the error microphone. If the user is in a scenario with wind noise, for example, the user rides or runs with the headset being worn, the external microphone is significantly affected by wind noise, resulting in difficulty in determining the volume during speech of the user from the external sound signal collected by the external microphone. However, the internal microphone is not significantly affected by the wind noise. Therefore, the target volume during speech of the user may be determined through the in-ear sound signal collected by the internal microphone. In this scenario, the vibration sensor does not need to be arranged in the headset, and the external microphone may not be connected to the first control unit.

In another scenario, the target volume during speech of the user may be determined through only the external sound signal collected by the external microphone. When the user is in a normal environment, for example, the user is not in a scenario with wind noise or the user is in a scenario in which a wind speed is less than a preset wind speed, the external microphone is subject to little interference. Therefore, the target volume during speech of the user may be determined through the external sound signal collected by the external microphone. In this scenario, the vibration sensor does not need to be arranged in the headset, and the error microphone may not be connected to the first control unit.

After the first control unit determines the target volume during speech of the user, the first control unit may search the prestored comparison table of relationship between a volume and a feedback filter parameter of a feedback filter for a feedback filter parameter matching the target volume, and transmit the feedback filter parameter to the feedback filter.

In the comparison table of relationship between a volume and a feedback filter parameter of a feedback filter, a volume is positively correlated with a feedback filter parameter. A larger volume indicates a larger feedback filter parameter, and a smaller volume indicates a smaller feedback filter parameter.

Since the volume during speech of the user is positively correlated with a low-frequency component rising degree resulted from a blocking effect, a larger determined target volume correspondingly indicates a larger strength of the blocking signal resulted from the blocking effect. In this case, the feedback filter parameter of the feedback filter may be increased, to suppress the blocking effect more effectively, thereby alleviating a phenomenon of excessive low-frequency components of the final voice signal heard in the ear canal as a result of insufficient deblocking. A smaller determined target volume correspondingly indicates a smaller strength of the blocking signal resulted from the blocking effect. In this case, the feedback filter parameter of the feedback filter may be reduced, to suppress the blocking effect more effectively, thereby alleviating a phenomenon of excessive deblocking.

S1408: The feedback filter processes the blocking signal based on the feedback filter parameter to obtain an inverted noise signal.

After receiving the feedback filter parameter transmitted by the first control unit, the feedback filter processes the blocking signal based on the transmitted feedback filter parameter, to obtain the inverted noise signal. The inverted noise signal has an amplitude similar to and a phase opposite to those of the blocking signal.

S1409: The second audio processing unit mixes the to-be-compensated sound signal and the inverted noise signal, to obtain a mixed audio signal.

S1410: The speaker plays the mixed audio signal.

It should be noted that, principles of S1409 to S1410 are similar to those of S607 to S608, and therefore are not described in detail herein to avoid repetition.

It may be learned that the sound signal processing manner corresponding to FIG. 13 and FIG. 14 is applicable to a deblocking scenario in which a user speaks at different volumes with a headset being worn, to improve deblocking effect consistency when the user speaks at different volumes with the headset being worn.

In this scenario, a first external environmental sound signal and a first voice signal sent by the user may be restored, that is, hearthrough of the first external environmental sound signal and the first voice signal sent by the user in the ear canal of the user may be realized without a need to additionally adjust a feedforward filter parameter of the feedforward filter or a target filter parameter of the target filter.

Certainly; in some other embodiments, the first control unit may determine a first strength of a low-frequency component in the external sound signal and a second strength of a low-frequency component in the in-ear sound signal based on the external sound signal collected by the external microphone and the in-ear sound signal collected by the error microphone.

If an absolute value of a difference between the first strength and the second strength is greater than a strength threshold, it is determined that the blocking effect results in a large amount of low-frequency component rise. In other words, the blocking signal has a relatively large strength. In this case, the first control unit may select a relatively large feedback filter parameter and transmit the selected feedback filter parameter to the feedback filter to adjust the blocking signal. If an absolute value of a difference between the first strength and the second strength is less than or equal to the strength threshold, it is determined that the blocking effect results in a small amount of low-frequency component rise. In other words, the blocking signal has a relatively small strength. In this case, the first control unit may select a relatively small feedback filter parameter and transmit the selected feedback filter parameter to the feedback filter to adjust the blocking signal.

Specifically, a comparison table of relationship between a strength difference and a feedback filter parameter is preset in the headset. The strength difference is a difference between a third strength and the strength threshold, and the third strength is the absolute value of the difference between the first strength and the second strength. The first control unit may calculate the absolute value of the difference between the first strength and the second strength, to obtain the third strength. Next, the first control unit calculates the difference between the third strength and the strength threshold, to obtain the strength difference. Then the comparison table of relationship between a strength difference and a feedback filter parameter is searched based on the calculated strength difference for a corresponding feedback filter parameter.

In the comparison table of relationship between a strength difference and a feedback filter parameter, the strength difference is positively correlated with the feedback filter parameter. A larger strength difference indicates a larger feedback filter parameter. A smaller strength difference indicates a smaller feedback filter parameter.

In this scenario, the vibration sensor may not be arranged in the headset, and the first control unit directly finds the corresponding feedback filter parameter based on the external sound signal and the in-ear sound signal.

During actual use, the user may wish to retain useful information in the external sound signal and remove unwanted noise signals. Therefore, in this embodiment of this application, not only is the feedback filter parameter of the feedback filter adjusted, but an environmental sound filter parameter of the first feedforward filter and/or a voice filter parameter of the second feedforward filter may be adjusted based on actual use. For a specific implementation, refer to the following description.

Figure 15:
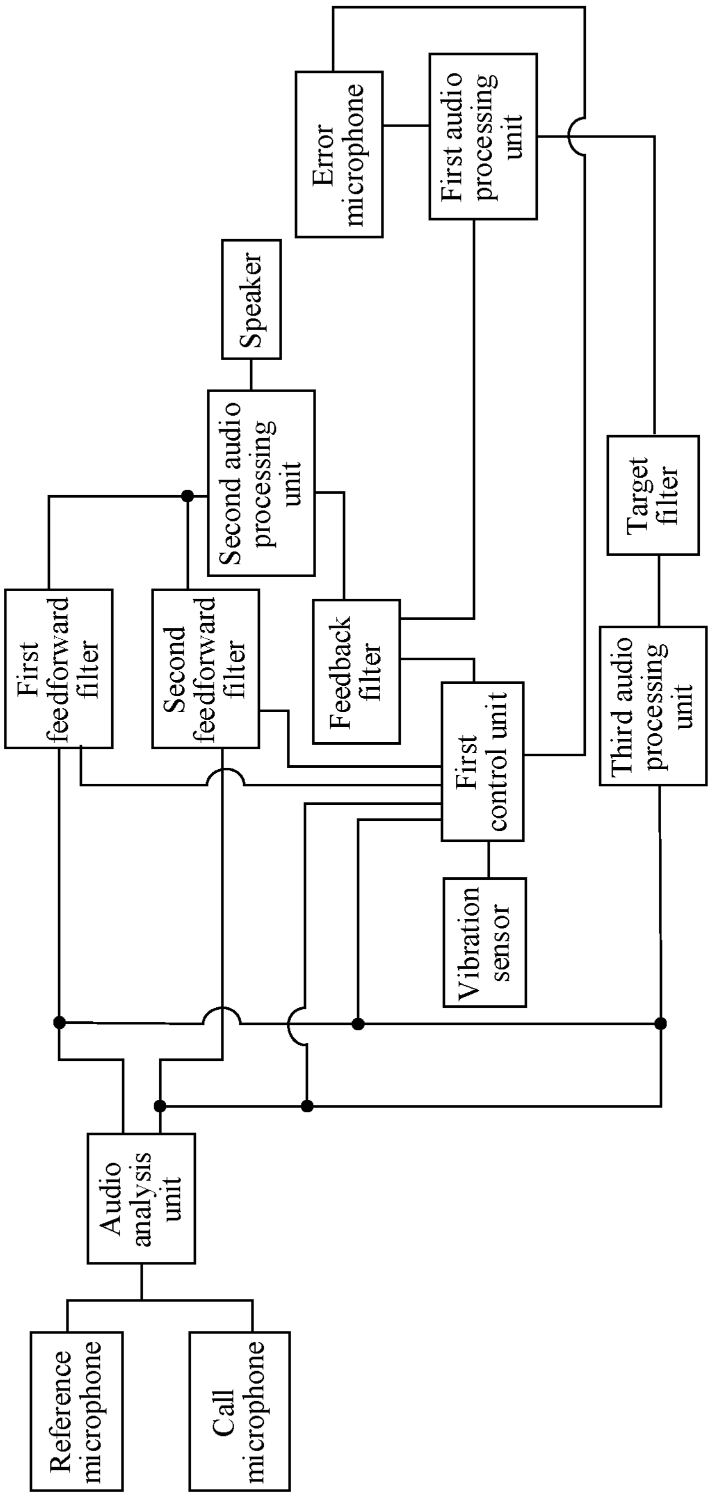
FIG. 15 is a schematic structural diagram of a fourth type of headset according to an embodiment of this application.

As an example, FIG. 15 is a schematic structural diagram of a fourth type of headset according to an embodiment of this application. As shown in FIG. 15, the headset includes a reference microphone, a call microphone, an error microphone, an audio analysis unit, a first feedforward filter, a second feedforward filter, a feedback filter, a target filter, a first audio processing unit, a second audio processing unit, a third audio processing unit, a vibration sensor, a first control unit, and a speaker.

A difference between the headset shown in FIG. 15 and the headset shown in FIG. 5 is that the headset shown in FIG. 5 has only one external microphone and only one feedforward filter arranged therein, while the headset shown in FIG. 15 have two external microphones and two feedforward filters arranged therein. The two external microphones are respectively the reference microphone and the call microphone, and the two feedforward filters are respectively the first feedforward filter and the second feedforward filter. In addition, the headset shown in FIG. 15 further includes the audio analysis unit, the third audio processing unit, the vibration sensor, and the first control unit.

The reference microphone and the call microphone are both connected to the audio analysis unit. The audio analysis unit is further connected to the first feedforward filter, the second feedforward filter, the third audio processing unit, and the first control unit. The third audio unit is connected to the target filter. The error microphone is connected to the first audio processing unit and the first control unit. The target filter is connected to the first audio processing unit. The first audio processing unit is further connected to the feedback filter. The vibration sensor is connected to the first control unit. The first control unit is connected to the feedback filter, the first feedforward filter, and the second feedforward filter. The feedback filter, the first feedforward filter, and the second feedforward filter are all connected to the second audio processing unit. The second audio processing unit is also connected to the speaker.

For detailed descriptions of the reference microphone, the call microphone, the audio analysis unit, the first feedforward filter, the second feedforward filter, the error microphone, the third audio processing unit, the target filter, the first audio processing unit, the second audio processing unit, and the speaker, refer to the descriptions corresponding to the headset shown in FIG. 10. To avoid repetition, the details are not described herein.

In addition, the vibration sensor is configured to collect a vibration signal when a user speaks with a headset being worn. The first control unit is configured to: determine information about a current scenario based on the vibration signal collected by the vibration sensor and a first external environmental sound signal and a first voice signal sent by the user that are obtained by the audio analysis unit through splitting, and adjust an environmental sound filter parameter of the first feedforward filter and/or a voice filter parameter of the second feedforward filter based on the scenario information.

It may be understood that the headset shown in FIG. 15 is merely an example provided in this embodiment of this application. During specific implementation of this application, the headset may have more or fewer components than shown, or may combine two or more components, or may have different component configurations. It should be noted that, in an optional case, the above components of the headset may also be coupled together.

Figure 16:
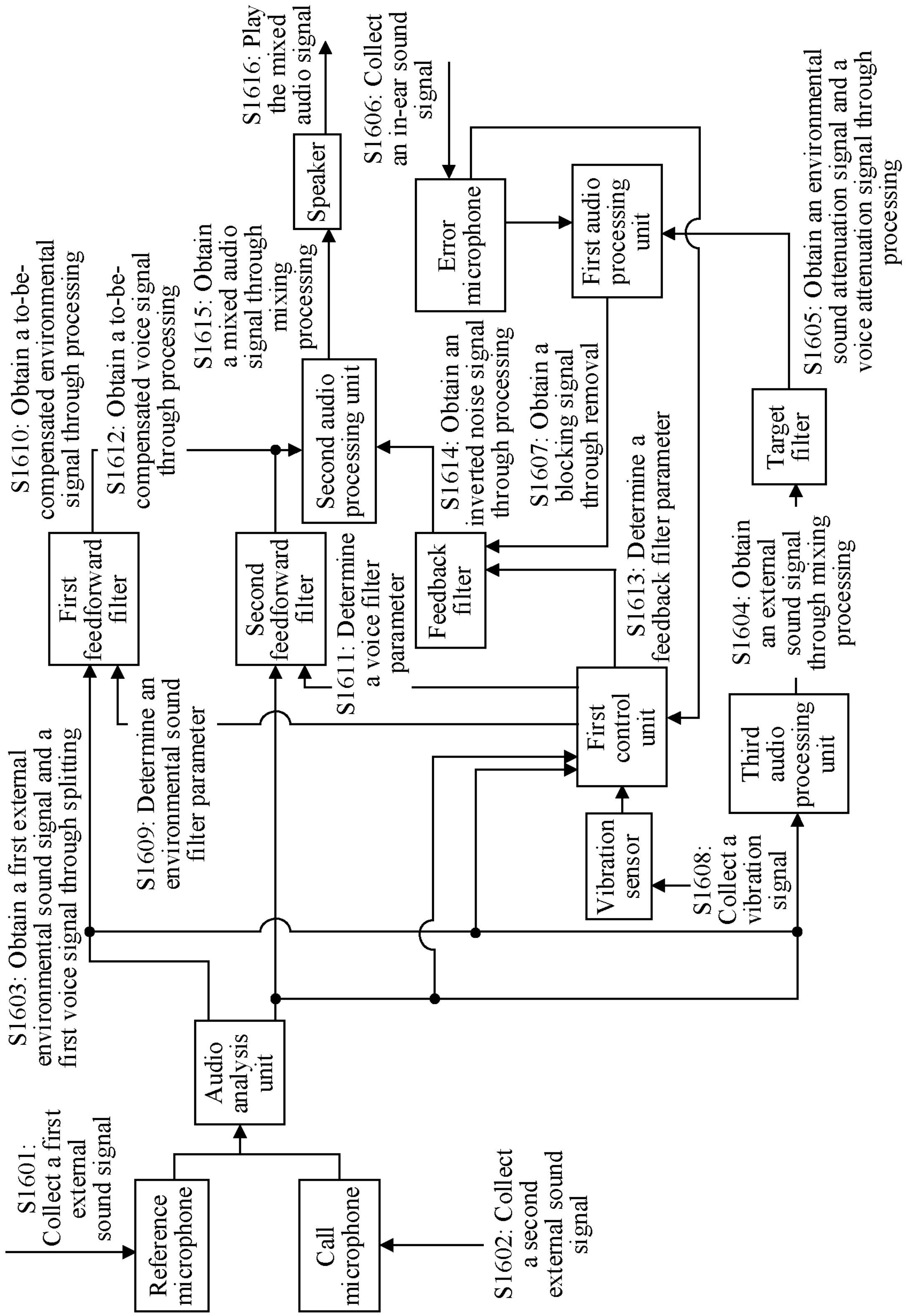
FIG. 16 is a schematic flowchart of a fourth sound signal processing method according to an embodiment of this application.

Based on the structural diagram of the headset shown in FIG. 15, a sound signal processing method provided in an embodiment of this application is described below: FIG. 16 is a schematic flowchart of a fourth sound signal processing method according to an embodiment of this application. The method is applicable to the headset shown in FIG. 10, and the headset is being worn by a user. The method may specifically include the following steps:

S1601: The reference microphone collects a first external sound signal.

S1602: The call microphone collects a second external sound signal.

S1603: The audio analysis unit splits the first external sound signal and the second external sound signal, to obtain a first external environmental sound signal and a first voice signal.

It should be noted that, principles of S1601 to S1603 are similar to those of S1101 to S1103, and therefore are not described in detail herein to avoid repetition.

S1604: The third audio processing unit mixes the first external environmental sound signal and the first voice signal, to obtain the external sound signal.

S1605: The target filter processes the external sound signal to obtain an environmental sound attenuation signal and a voice attenuation signal.

S1606: The error microphone collects an in-ear sound signal.

S1607: The first audio processing unit removes a second external environmental sound signal and a second voice signal from the in-ear sound signal, to obtain a blocking signal.

It should be noted that, principles of S1604 are similar to those of S1106, and principles of S1605 to S1607 are similar to those of S603 to S605, and therefore are not described in detail herein to avoid repetition.

S1608: The vibration sensor collects a vibration signal.

S1609: The first control unit determines an environmental sound filter parameter of the first feedforward filter based on the first external environmental sound signal and the first voice signal.

S1610: The first feedforward filter processes the first external environmental sound signal based on the determined environmental sound filter parameter, to obtain a to-be-compensated environmental signal.

The first control unit may receive the first external environmental sound signal and the first voice signal obtained by the audio analysis unit through splitting, and obtain a signal strength of the first external environmental sound signal and a signal strength of the first voice signal. When a difference between the signal strength of the first external environmental sound signal and the signal strength of the first voice signal is less than a first set threshold, it is determined that the user is in a relatively quiet external environment.

In this scenario, the first control unit may reduce the environmental sound filter parameter of the first feedforward filter, so that the first feedforward filter processes the first external environmental sound signal based on the determined environmental sound filter parameter, to obtain the to-be-compensated environmental signal, so that a final environmental sound signal heard in an ear canal is reduced, thereby reducing negative hearing caused by background noise of circuits and microphone hardware.

S1611: The first control unit determines a voice filter parameter of the second feedforward filter based on the first external environmental sound signal and the first voice signal.

S1612: The second feedforward filter processes the first voice signal based on the determined voice filter parameter to obtain a to-be-compensated voice signal.

Correspondingly, when the difference between the signal strength of the first external environmental sound signal and the signal strength of the first voice signal is greater than a second set threshold, it is determined that the user is in a noisy external environment. The second set threshold may be greater than or equal to the first set threshold.

In this scenario, the first control unit may increase the voice filter parameter of the second feedforward filter, so that the second feedforward filter processes the first voice signal based on the determined voice filter parameter to obtain the to-be-compensated voice signal. The to-be-compensated voice signal is combined with a voice signal leaking into the ear canal through a gap between the headset and the ear canal, so that the final voice signal in the ear canal is greater than the first voice signal in the external environment, thereby increasing the final voice signal heard in the ear canal. In this way, the user can clearly hear the voice of the user in an environment with large noise.

S1613: The first control unit determines a target volume based on the vibration signal, the external sound signal, and the in-ear sound signal, and finds a feedback filter parameter of the feedback filter based on the target volume.

S1614: The feedback filter processes the blocking signal based on the determined feedback filter parameter to obtain an inverted noise signal.

It should be noted that, principles of S1613 to S1614 are similar to those of S1407 to S1408, and therefore are not described in detail herein to avoid repetition.

S1615: The second audio processing unit mixes the to-be-compensated environmental signal, the to-be-compensated voice signal, and the inverted noise signal, to obtain a mixed audio signal.

S1616: The speaker plays the mixed audio signal.

It may be learned that the sound signal processing manner corresponding to FIG. 15 and FIG. 16 is applicable to a deblocking scenario in which a user speaks at different volumes with a headset being worn, to improve deblocking effect consistency when the user speaks at different volumes with the headset being worn. Moreover, the sound signal processing manner is further applicable to different external environments. Through proper adjustment of the environmental sound filter parameter of the first feedforward filter and/or the voice filter parameter of the second feedforward filter, requirements in different scenarios can be satisfied.

The adjustment of the environmental sound filter parameter of the first feedforward filter, the voice filter parameter of the second feedforward filter, and the feedback filter parameter of the feedback filter through one or more of the external microphone, the internal microphone, and the vibration sensor is described above. Certainly; the environmental sound filter parameter of the first feedforward filter, the voice filter parameter of the second feedforward filter, and the feedback filter parameter of the feedback filter may be set in another manner.

Figure 17:
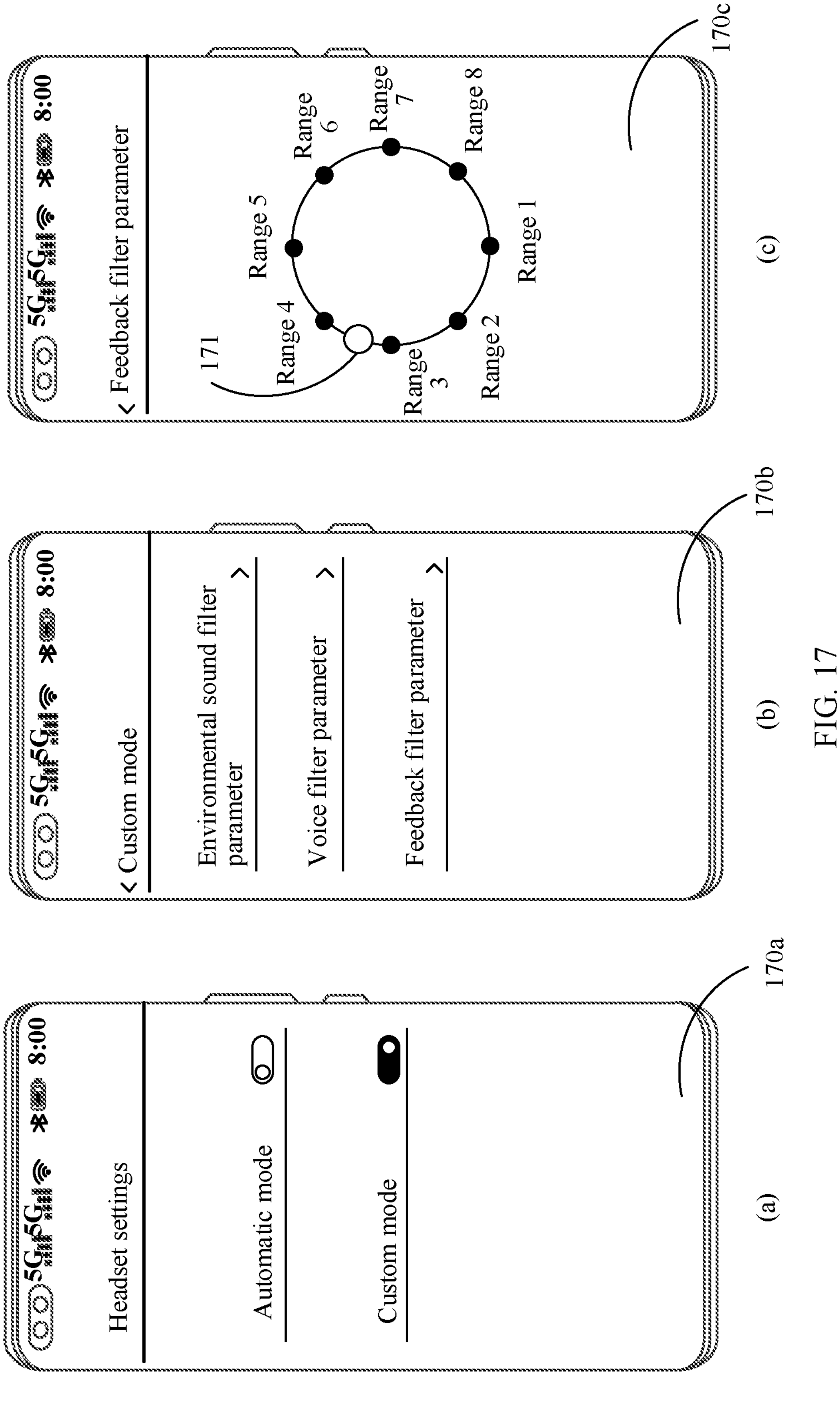
FIG. 17 is a schematic diagram of a control interface of a terminal device according to an embodiment of this application.

In a possible implementation, refer to FIG. 17. FIG. 17 shows an example control interface of a terminal device according to an embodiment of this application. In some embodiments, the control interface may be considered as a user-oriented input interface that provides controls of a plurality of functions to enable a user to control a headset by controlling related controls.

An interface shown in (a) in FIG. 17 is a first interface 170*a* displayed on the terminal device. Two mode selection controls are displayed on the first interface 170*a*, which are respectively an automatic mode control and a custom mode control. The user may perform corresponding operations on the first interface 170*a* to control, in different manners, a manner of determining a filter parameter in the headset.

When the user enters a first operation for the custom mode control on the first interface 170*a*, where the first operation may be a selection parameter, such as a tapping operation, a double tapping operation, or a touch and hold operation, on the custom mode control on the first interface 170*a*, the terminal device jumps to an interface shown in (b) in FIG. 17 in response to the first operation.

The interface shown in (b) in FIG. 17 is a second interface 170*b* displayed on the terminal device. The second interface 170*b* displays an environmental sound filter parameter setting option, a voice filter parameter setting option, and a feedback filter parameter setting option. When the user enters a second operation for the feedback filter parameter setting option on the second interface 170*b*, the terminal device jumps to an interface shown in (c) in FIG. 17 in response to the first operation.

The interface shown in (c) in FIG. 17 is a third interface 170*c* displayed on the terminal device. The third interface 170*c* displays a range disc. The range disc includes a plurality of ranges, such as a range 1 to a range 8. Each range corresponds to a feedback filter parameter. A range adjustment button 171 indicates a range, and the terminal device stores the feedback filter parameter corresponding to each range. Therefore, the terminal device finds a corresponding feedback filter parameter based on a range selected by the user by using the range adjustment button 171, and sends the feedback filter parameter to the headset through a radio link such as Bluetooth.

A wireless communication module such as Bluetooth may be arranged in the headset. The wireless communication module may be further connected to the first control unit in the headset. The wireless communication module in the headset receives feedback filter parameter sent by the terminal device, and transmits the feedback filter parameter to the first control unit. The first control unit then transmits the feedback filter parameter to the feedback filter, so that the feedback filter processes the blocking signal based on the feedback filter parameter.

Certainly, the feedback filter parameter corresponding to each range may be configured in the headset. After the user selects the range by using the range adjustment button 171, the terminal device sends the range information to the headset through the radio link. The wireless communication module in the headset receives the range information sent by the terminal device, finds a corresponding feedback filter parameter based on the range information, and transmits the found feedback filter parameter to the feedback filter, so that the feedback filter processes the blocking signal based on the feedback filter parameter.

It should be noted that, when the user selects the environmental sound filter parameter setting option or the voice filter parameter setting option on the second interface 170*b*, an interface displayed on the terminal device is similar to the third interface 170*c* shown in (c) in FIG. 17. Correspondingly, the environmental sound filter parameter or the voice filter parameter may be selected through a similar operation.

When the user enters a third operation for the automatic mode control on the first interface 170*a*, the terminal device enters the automatic detection mode. The terminal device automatically detects an external environment where the user is located, such as a noisy external environment or a relatively quiet external environment, and determines one or more of the environmental sound filter parameter, the voice filter parameter, and the feedback filter parameter based on the detected external environment. After determining the corresponding filter parameter, the terminal device may send the filter parameter to the headset through the radio link.

It may be understood that when only one external microphone and a corresponding feedforward filter are arranged in the headset, the second interface 170*b* may display only the feedforward filter parameter setting option and the feedback filter parameter setting option.

It should be noted that, the above embodiment shown in FIG. 17 is merely intended to explain the solution of this application, and is not intended to limit the solution of this application. During actual application, the control interface on the terminal device include may more or fewer controls/elements/symbols/functions/text/patterns/colors, or the controls/elements/symbols/functions/text/patterns/colors on the control interface may present other deformation forms. For example, the range corresponding to each filter parameter may be designed as an adjustment bar for touch and control by the user. This is not limited in this embodiment of this application.

In a possible scenario, when the user is in a scenario with wind noise, for example, the user rides or runs with the headset being worn, a wind speed may affect the sound signal transmitted into the ear canal through the headset. When the user is in the scenario with wind noise with the headset being worn, the user may still wish to improve a restoration degree of an external environmental sound and realize suppression of wind noise. Wind noise is a whistling sound in an external environment resulted from wind, which affects normal use of headset by a user.

Figure 18:
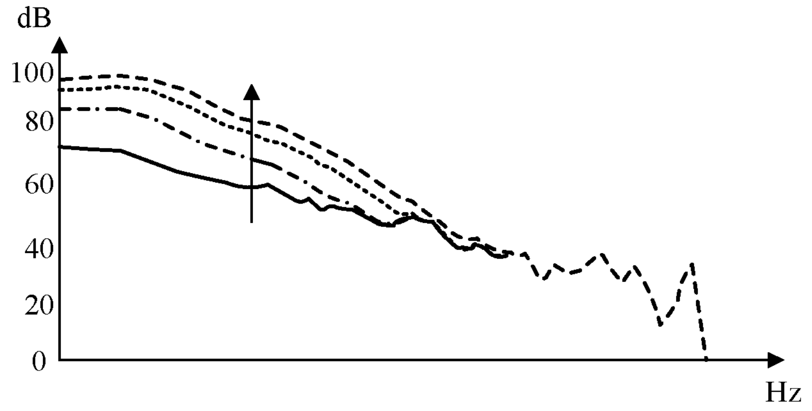
FIG. 18 is a schematic diagram of frequency response noise of an eardrum reference point affected by a wind speed after a user wears a headset in a scenario with wind noise according to an embodiment of this application.

Refer to FIG. 18. FIG. 18 is a schematic diagram of frequency response noise of an eardrum reference point affected by a wind speed after a user wears a headset in a scenario with wind noise according to an embodiment of this application. A horizontal axis represents a frequency of external environmental noise in a unit of Hz, and a vertical axis represents a frequency response value of the eardrum reference point in a unit of dB. In a direction indicated by an arrow; frequency response noise of the eardrum reference point corresponding to different wind speeds is shown. In the direction indicated by the arrow, wind speeds corresponding to line segments increase successively:

It may be learned that, when the user wears the headset, the frequency response value of the eardrum reference point is affected by the wind speed, and as the wind speed increases, a bandwidth corresponding to the frequency response value of the eardrum reference point increases.

Figure 19:
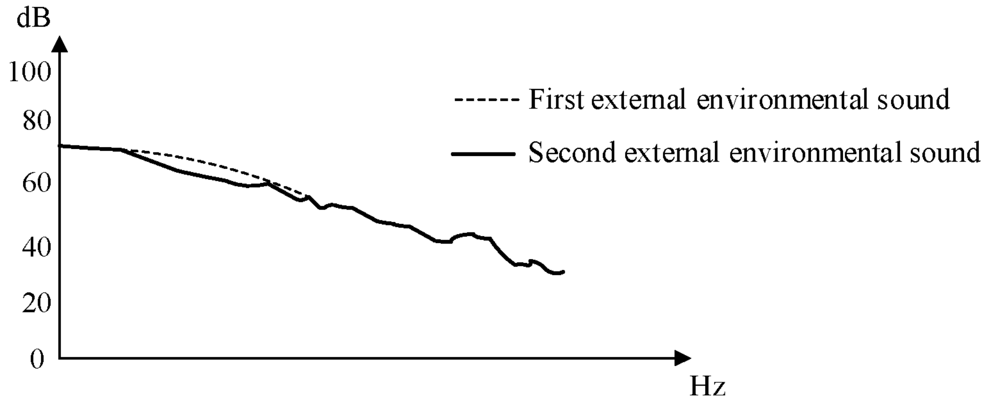
FIG. 19 is a schematic diagram of frequency response noise of an eardrum reference point in a scenario with wind noise and in a scenario without wind noise according to an embodiment of this application.

Refer to FIG. 19. FIG. 19 is a schematic diagram of frequency response noise of an eardrum reference point in a scenario with wind noise and in a scenario without wind noise according to an embodiment of this application. A curve corresponding to a first external environmental sound is a curve of relationship between a frequency response value of an eardrum reference point and a frequency outside the scenario with wind noise, and a curve corresponding to a second external environmental sound is a curve of relationship between a frequency response value of an eardrum reference point and a frequency in the scenario with wind noise.

It may be learned that, when the user is in the scenario with wind noise with the headset being worn, the external microphone in the headset will receive an excessive amount of low-frequency noise similar to the whistling sound resulted from wind as a result of presence of a wind noise signal.

When the user is in the scenario with wind noise with the headset being worn, if the target filter still attenuates the external sound signal based on a target filter parameter during pretesting, a low-frequency component in the audio signal played by the speaker is higher than a low-frequency component in the audio signal played by the speaker in a stable environment, resulting in more wind noise finally heard in the ear canal in the scenario with wind noise.

In some related arts, headsets with a hearthrough function usually disable an external microphone function in a scenario with wind noise. However, in this manner, wind noise cannot be effectively suppressed, and the hearthrough function of the headsets cannot be effectively maintained.

Therefore, in this embodiment of this application, the target filter parameter of the target filter may be further adjusted to reduce the final wind noise heard in the ear canal in the scenario with wind noise. For a specific implementation, refer to the following description.

Figure 20:
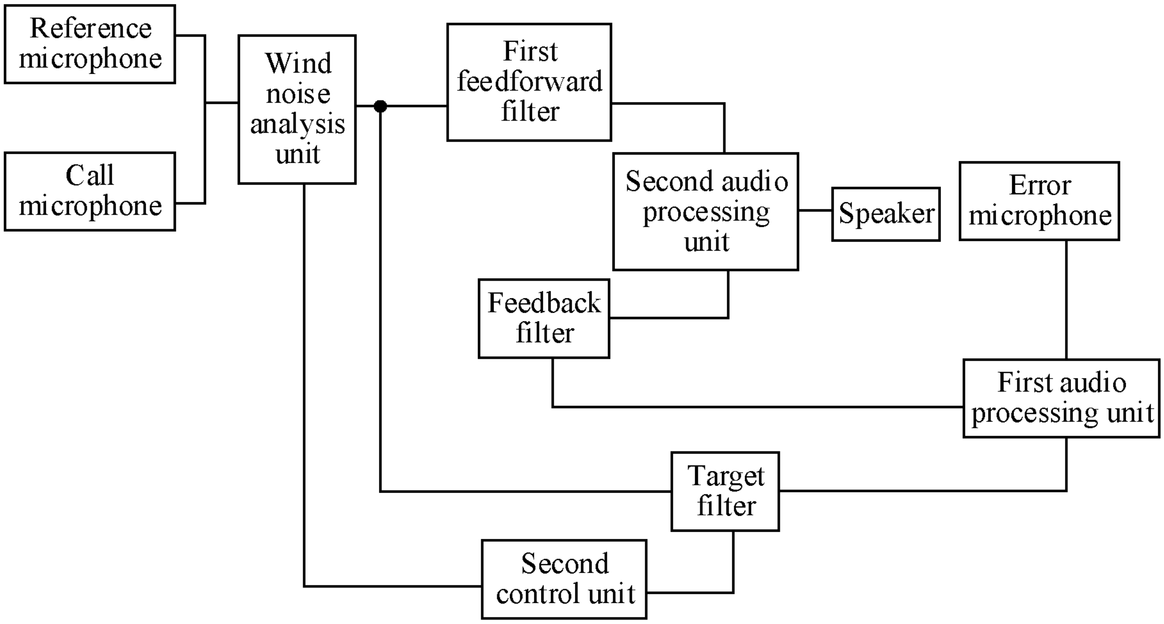
FIG. 20 is a schematic structural diagram of a fifth type of headset according to an embodiment of this application.

As an example, FIG. 20 is a schematic structural diagram of a fifth type of headset according to an embodiment of this application. As shown in FIG. 20, the headset includes a reference microphone, a call microphone, an error microphone, a wind noise analysis module, a first feedforward filter, a feedback filter, a target filter, a first audio processing unit, a second audio processing unit, a second control unit, and a speaker.

A difference between the headset shown in FIG. 20 and the headset shown in FIG. 5 is that the headset shown in FIG. 5 has only one external microphone arranged therein, while the headset shown in FIG. 20 have two external microphones arranged therein. The two external microphones are respectively the reference microphone and the call microphone. In addition, the headset shown in FIG. 20 further includes the wind noise analysis module and the second control unit.

The reference microphone and the call microphone are both connected to the wind noise analysis unit. The wind noise analysis unit is further connected to the first feedforward filter, the second control unit, and the target filter. The second control unit is further connected to the target filter. The error microphone and the target filter are both connected to the first audio processing unit. The first audio processing unit is further connected to the feedback filter. The feedback filter and the first feedforward filter are both connected to the second audio processing unit. The second audio processing unit is further connected to the speaker.

The reference microphone collects a first external sound signal, and the call microphone collects a second external sound signal. The wind noise analysis unit is configured to calculate a correlation between the first external sound signal and the second external sound signal, to analyze a strength of external environmental wind.

The second control unit is configured to adjust a target filter parameter of the target filter based on the strength of the external environmental wind calculated by the wind noise analysis unit.

When the strength of the external environmental wind is relatively high, the target filter parameter of the target filter is reduced, so that the first external environmental sound signal is removed to a small degree when the target filter processes the first external environmental sound signal in the external sound signal. In this case, a signal processed by the first audio processing unit includes a blocking signal and partial environmental noise signal. When processing the signal transmitted by the first audio processing unit, the feedback filter may remove the partial environmental noise signal, thereby reducing the final wind noise heard in the ear canal in the scenario with wind noise.

It should be noted that, since users usually do not speak in the scenario with wind noise, the second feedforward filter is not shown in the headset shown in FIG. 20.

Certainly; in actual products, the second feedforward filter and the audio analysis unit configured to distinguish between the external environmental sound signal and the voice signal sent by the user may be arranged in the headset.

It may be understood that the headset shown in FIG. 20 is merely an example provided in this embodiment of this application. During specific implementation of this application, the headset may have more or fewer components than shown, or may combine two or more components, or may have different component configurations. It should be noted that, in an optional case, the above components of the headset may also be coupled together.

Figure 21:
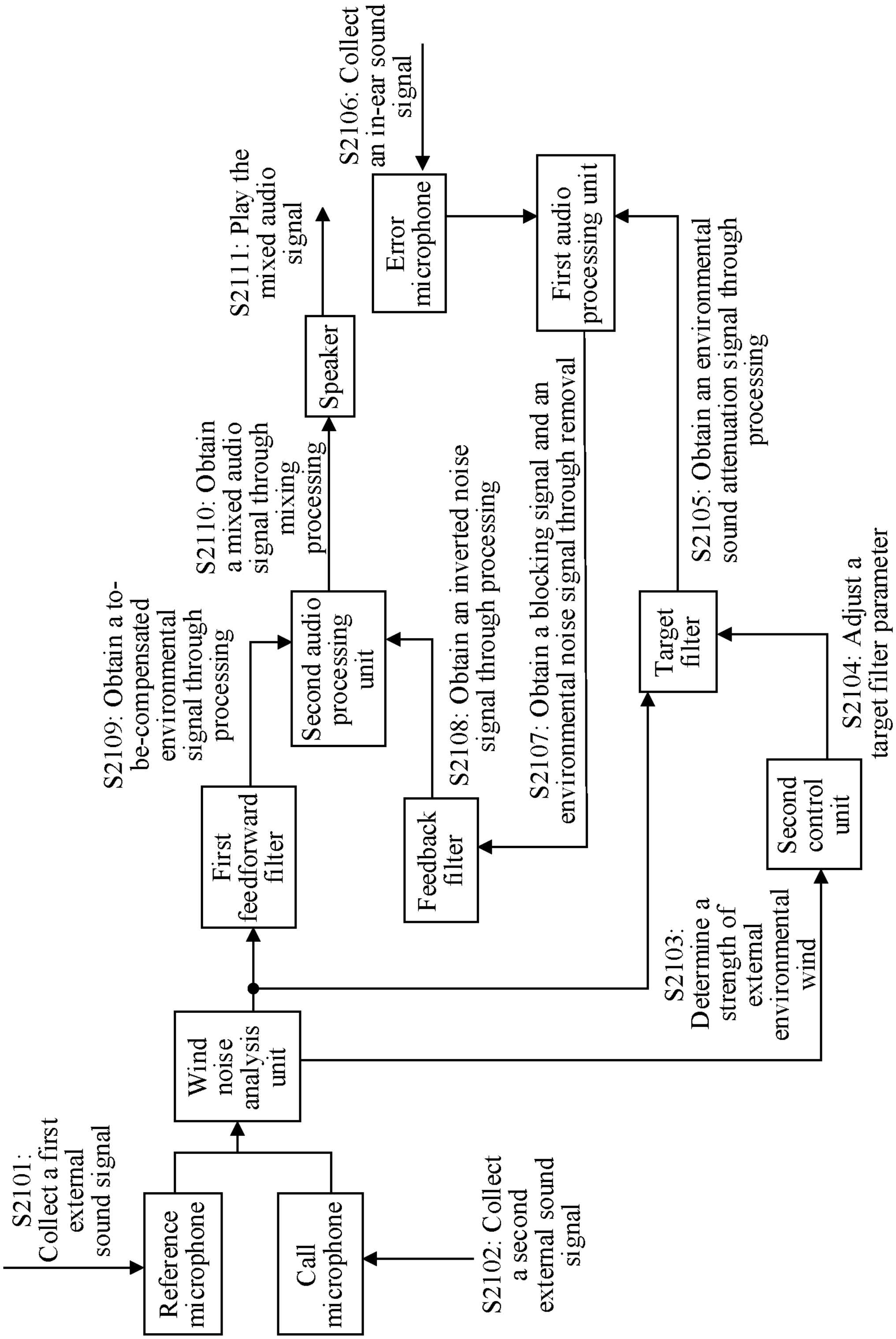
FIG. 21 is a schematic flowchart of a fifth sound signal processing method according to an embodiment of this application.

Based on the structural diagram of the headset shown in FIG. 20, a sound signal processing method provided in an embodiment of this application is described below: FIG. 21 is a schematic flowchart of a fifth sound signal processing method according to an embodiment of this application. The method is applicable to the headset shown in FIG. 20, and the headset is being worn by a user. In this case, the user is in a scenario with wind noise, and the user does not send a voice signal. The method may specifically include the following steps:

S2101: The reference microphone collects a first external sound signal.

S2102: The call microphone collects a second external sound signal.

S2103: The wind noise analysis unit calculates a strength of external environmental wind based on the first external sound signal and the second external sound signal.

When the user is in the scenario with wind noise with the headset being worn and does not send a voice signal, the first external sound signal and the second external sound signal both include only an external environmental sound signal.

When the user normally wears the headset, due to the different positions of the reference microphone and the call microphone, a larger strength of external environmental wind in the external environment where the user is located indicates a smaller correlation between the first external sound signal collected by the reference microphone and the second external sound signal collected by the call microphone, and a smaller strength of the external environmental wind in the external environment where the user is located indicates a larger correlation between the first external sound signal collected by the reference microphone and the second external sound signal collected by the call microphone. The correlation between the first external sound signal and the second external sound signal is negatively correlated with the strength of the external environmental wind in the external environment.

The wind noise analysis unit calculates the correlation between the first external sound signal and the second external sound signal to analyze the strength of the external environmental wind, and transmits the determined strength of the external environmental wind to the second control unit.

S2104: The second control unit adjusts a target filter parameter of the target filter based on the strength of the external environmental wind.

The second control unit adjusts the target filter parameter of the target filter based on the strength of the external environmental wind calculated by the wind noise analysis unit. When the strength of the external environmental wind is relatively large, the target filter parameter of the target filter is reduced. In other words, the strength of the external environmental wind is negatively correlated with the target filter parameter of the target filter.

In a possible implementation, a comparison table of relationship between a strength of environmental wind and a target filter parameter is preset in the headset. After determining the strength of the external environmental wind, the second control unit searches the comparison table of relationship for a corresponding target filter parameter.

S2105: The target filter processes the external sound signal to obtain an environmental sound attenuation signal.

The target filter receives the target wave parameter transmitted by the second control unit, and processes the external sound signal based on the target filter parameter to obtain the environmental sound attenuation signal.

It may be understood that a smaller target filter parameter indicates a smaller degree to which an environmental sound attenuation signal obtained by processing the external sound signal by the target filter is removed, compared with the external sound signal collected by the external microphone, and a larger target filter parameter indicates a larger degree to which an environmental sound attenuation signal obtained by processing the external sound signal by the target filter is removed, compared with the external sound signal collected by the external microphone.

S2106: The error microphone collects an in-ear sound signal.

S2107: The first audio processing unit removes a part of the in-ear sound signal based on the environmental sound attenuation signal to obtain a blocking signal and an environmental noise signal.

If an amount of the environmental sound attenuation signal obtained by processing the external sound signal by the target filter is small, after the first audio processing unit removes a part of the in-ear sound signal based on the environmental sound attenuation signal, a remaining signal includes not only the blocking signal but also partial environmental noise signal.

A smaller amount of environmental sound attenuation signal obtained by the target filter through processing indicates a larger amount of environmental noise signal obtained by the first audio processing unit through processing, and a larger amount of environmental sound attenuation signal obtained by the target filter through processing indicates a smaller amount of environmental noise signal obtained by the first audio processing unit through processing.

S2108: The feedback filter processes the blocking signal and the environmental noise signal to obtain an inverted noise signal.

The inverted noise signal obtained by processing the blocking signal and the environmental noise signal by the feedback filter has an amplitude similar to and a phase opposite to a mixed signal (a mixed signal of the blocking signal and the environmental noise signal).

Therefore, during subsequent playback of the inverted noise signal by using the speaker, the environmental noise signal may be removed, to reduce the final wind noise heard in an ear canal in the scenario with wind noise.

S2109: The first feedforward filter processes the external sound signal to obtain a to-be-compensated environmental signal.

The external sound signal may include only the external environmental sound signals collected by the reference microphone and the call microphone.

S2110: The second audio processing unit mixes the to-be-compensated environmental signal and the inverted noise signal, to obtain a mixed audio signal.

S2111: The speaker plays the mixed audio signal.

Therefore, when the user is in the scenario with wind noise with the headset being worn, if neither the target filter parameter of the target filter is reduced nor a feedforward filter parameter of the feedforward filter is changed, the to-be-compensated environmental sound signal obtained by processing by the feedforward filter may include additional low-frequency noise resulted from wind noise. Therefore, in this embodiment of this application, even if the feedforward filter parameter of the feedforward filter is not changed, the target filter parameter of the target filter may be adjusted to reduce the final wind noise heard in the ear canal in the scenario with wind noise.

In a possible implementation, the headset in embodiments of this application is applicable to the following two scenarios: In a scenario in which a user speaks with a headset being worn, through the headset, not only is a blocking effect suppressed, but a restoration degree of a first external environmental sound signal and a first voice signal sent by the user is improved. In another scenario, when a user is in a scenario with wind noise with a headset being worn, through the headset, final wind noise heard in an ear canal is reduced.

Figure 22:
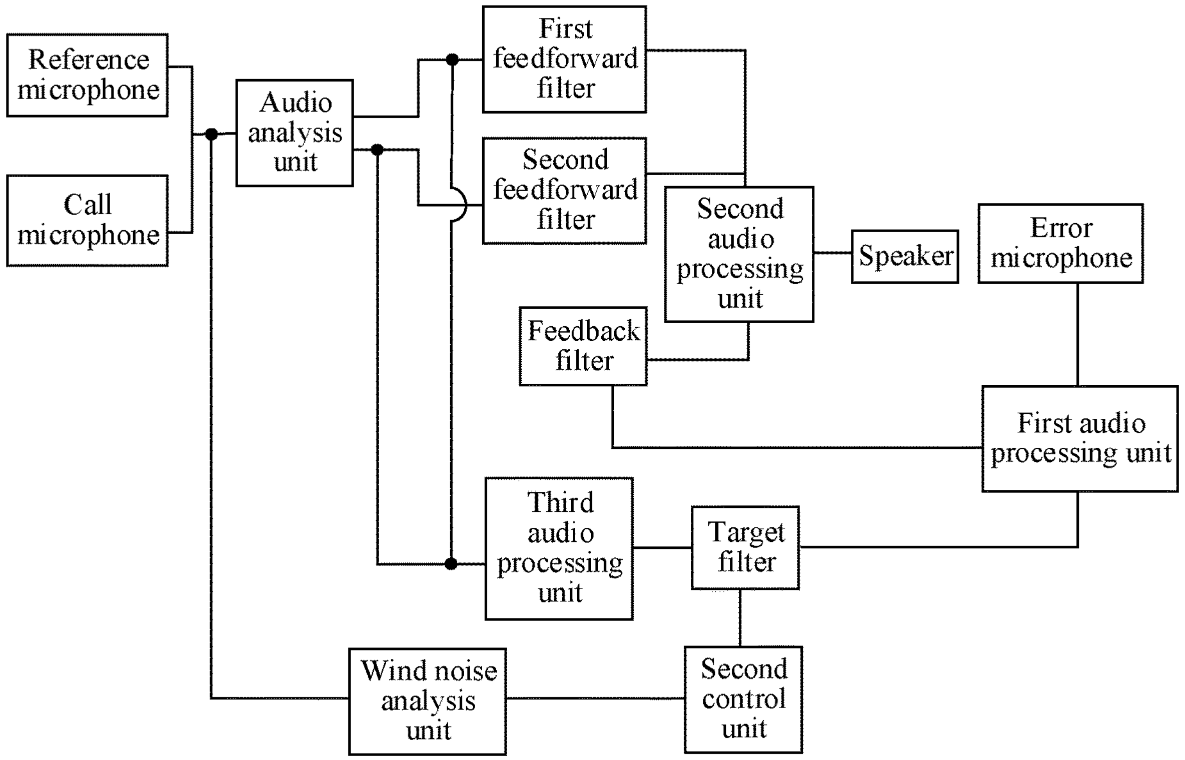
FIG. 22 is a schematic structural diagram of a sixth type of headset according to an embodiment of this application.

A specific hardware structure in the headset may be shown in FIG. 22. FIG. 22 is a schematic structural diagram of a sixth type of headset according to an embodiment of this application. As shown in FIG. 22, the headset includes a reference microphone, a call microphone, an error microphone, an audio analysis unit, a first feedforward filter, a second feedforward filter, a feedback filter, a target filter, a first audio processing unit, a second audio processing unit, a third audio processing unit, a speaker, a wind noise analysis unit, and a second control unit.

The schematic diagram of the headset structure shown in FIG. 22 may be understood as a structure obtained through combination of the headsets shown in FIG. 10 and FIG. 20. The same hardware structures in FIG. 10 and FIG. 20 may be shared. For example, hardware structures such as the target filter, the reference microphone, and the error microphone may be shared.

For a specific function of each hardware structure in the headset shown in FIG. 22, refer to the detailed descriptions of the headsets shown in FIG. 10 and FIG. 20. To avoid repetition, the details are not described herein.

Embodiments of this application are described with reference to the flowcharts and/or block diagrams of the method, the device (system), and the computer program product according to embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of the another programmable data processing device.

The objectives, technical solutions, and benefits of this application are further described in detail in the above specific implementations. It should be understood that the above descriptions are merely specific implementations of this application, and are not intended to limit the protection scope of this application. Any modification, equivalent replacement, or improvement made based on the technical solutions in this application falls within the protection scope of this application.

What is claimed is:

1. A headset device, comprising:

an external microphone configured to collect an external sound signal, wherein the external sound signal comprises a first external environmental sound signal and a first voice signal;

an error microphone configured to collect an in-ear sound signal, wherein the in-ear sound signal comprises a second external environmental sound signal, a second voice signal, and a blocking signal, and wherein a signal strength of the second external environmental sound signal is less than a signal strength of the first external environmental sound signal, and a signal strength of the second voice signal is less than a signal strength of the first voice signal;

a feedforward filter coupled to the external microphone, wherein the feedforward filter is configured to process the external sound signal to obtain a to-be-compensated sound signal;

a target filter coupled to the external microphone, wherein the target filter is configured to process the external sound signal to obtain an environmental sound attenuation signal and a voice attenuation signal;

a first audio processing unit coupled to the target filter and the error microphone, wherein the first audio processing unit is configured to remove the second external environmental sound signal and the second voice signal from the in-ear sound signal based on the environmental sound attenuation signal and the voice attenuation signal, to obtain the blocking signal;

a feedback filter coupled to the first audio processing unit, wherein the feedback filter is configured to process the blocking signal to obtain an inverted noise signal;

a second audio processing unit coupled to the feedforward filter and the feedback filter, wherein the second audio processing unit is configured to mix the to-be-compensated sound signal and the inverted noise signal, to obtain a mixed audio signal;

a speaker coupled to the second audio processing unit and configured to play the mixed audio signal;

a vibration sensor configured to collect a vibration signal during sound production by a user; and a first control unit configured to obtain a corresponding feedback filter parameter based on a target volume during sound production by the user, wherein the target volume is based on one or more of the vibration signal, the external sound signal, and the in-ear sound signal, wherein the feedback filter is configured to process the blocking signal based on the feedback filter parameter to obtain the inverted noise signal, wherein a first volume is based on an amplitude of the vibration signal, wherein a second volume is based on a signal strength of the external sound signal, wherein a third volume is based on a signal strength of the in-ear sound signal, wherein the target volume during sound production by the user is based on the first volume, the second volume, and the third volume; and wherein the first control unit is configured to calculate a weighted average of the first volume, the second volume, and the third volume, to obtain the target volume.

2. The headset device of claim 1, further comprising a first control unit configured to:

obtain a first strength of a low-frequency component in the external sound signal and a second strength of a low-frequency component in the in-ear sound signal; and obtain a corresponding feedback filter parameter based on the first strength, the second strength, and a strength threshold, wherein the feedback filter is configured to process the blocking signal based on the feedback filter parameter to obtain the inverted noise signal.

3. The headset device of claim 2, wherein the first control unit is configured to:

obtain a third strength based on an absolute value of a difference between the first strength and the second strength;

obtain a strength difference based on a difference between the third strength and the strength threshold; and obtain the corresponding feedback filter parameter based on the strength difference.

4. The headset device of claim 1, wherein the external microphone comprises:

a reference microphone configured to collect a first external sound signal; and a call microphone configured to collect a second external sound signal, wherein the headset device further comprises an audio analysis unit configured to process the first external sound signal and the second external sound signal, to obtain the first external environmental sound signal and the first voice signal, wherein the feedforward filter comprises:

a first feedforward filter configured to process the first external environmental sound signal to obtain a to-be-compensated environmental signal; and a second feedforward filter configured to process the first voice signal to obtain a to-be-compensated voice signal, wherein the to-be-compensated sound signal comprises the to-be-compensated environmental signal and the to-be-compensated voice signal, and wherein the headset device further comprises a third audio processing unit configured to mix the first external environmental sound signal and the first voice signal, to obtain the external sound signal.

5. The headset device of claim 4, further comprising a first control unit configured to:

obtain the signal strength of the first external environmental sound signal and the signal strength of the first voice signal; and adjust an environmental sound filter parameter of the first feedforward filter and/or a voice filter parameter of the second feedforward filter based on the signal strength of the first external environmental sound signal and the signal strength of the first voice signal, wherein the first feedforward filter is configured to process the first external environmental sound signal based on the environmental sound filter parameter determined by the first control unit, to obtain the to-be-compensated environmental signal, and wherein the second feedforward filter is configured to process the first voice signal based on the voice filter parameter determined by the first control unit, to obtain the to-be-compensated voice signal.

6. The headset device of claim 5, wherein the first control unit is configured to:

reduce the environmental sound filter parameter of the first feedforward filter when a difference between the signal strength of the first external environmental sound signal and the signal strength of the first voice signal is less than a first set threshold; and increase the voice filter parameter of the second feedforward filter when the difference between the signal strength of the first external environmental sound signal and the signal strength of the first voice signal is greater than a second set threshold.

7. The headset device of claim 4, further comprising:

a wireless communication module configured to receive a filter parameter from a terminal device, wherein the filter parameter comprises one or more of an environmental sound filter parameter, a voice filter parameter, and a feedback filter parameter; and a first control unit configured to receive the filter parameter from the wireless communication module.

8. A method, comprising:

collecting an external sound signal that comprises a first external environmental sound signal and a first voice signal, wherein a second volume is based on a signal strength of the external sound signal;

collecting an in-ear sound signal that comprises a second external environmental sound signal, a second voice signal, and a blocking signal, wherein a signal strength of the second external environmental sound signal is less than a signal strength of the first external environmental sound signal, wherein a signal strength of the second voice signal is less than a signal strength of the first voice signal, and wherein a third volume is based on a signal strength of the in-ear sound signal;

processing the external sound signal to obtain a to-be-compensated sound signal;

processing the external sound signal to obtain an environmental sound attenuation signal and a voice attenuation signal;

removing the second external environmental sound signal and the second voice signal from the in-ear sound signal based on the environmental sound attenuation signal and the voice attenuation signal, to obtain the blocking signal;

collecting a vibration signal during sound production by a user, wherein a first volume is based on an amplitude of the vibration signal;

calculating a weighted average of the first volume, the second volume, and the third volume, to obtain a target volume;

obtaining a corresponding feedback filter parameter based on the target volume during sound production by the user, wherein the target volume is based on one or more of the vibration signal, the external sound signal, and the in-ear sound signal;

processing the blocking signal based on the feedback filter parameter to obtain an inverted noise signal;

mixing the to-be-compensated sound signal and the inverted noise signal to obtain a mixed audio signal; and playing the mixed audio signal.

9. The method of claim 8, further comprising:

obtaining a first strength of a low-frequency component in the external sound signal and a second strength of a low-frequency component in the in-ear sound signal;

obtaining a corresponding feedback filter parameter based on the first strength, the second strength, and a strength threshold; and processing the blocking signal based on the feedback filter parameter to obtain the inverted noise signal.

10. The method of claim 9, further comprising:

obtaining a third strength based on an absolute value of a difference between the first strength and the second strength;

obtaining a strength difference based on a difference between the third strength and the strength threshold; and obtaining the corresponding feedback filter parameter based on the strength difference.

11. The method of claim 8, wherein the external sound signal comprises collecting a first external sound signal through a reference microphone, and collecting a second external sound signal through a call microphone, wherein processing the external sound signal to obtain the to-be-compensated sound signal comprises:

processing the first external sound signal and the second external sound signal, to obtain the first external environmental sound signal and the first voice signal;

processing the first external environmental sound signal to obtain a to-be-compensated environmental signal; and processing the first voice signal to obtain a to-be-compensated voice signal, wherein the to-be-compensated sound signal comprises the to-be-compensated environmental signal and the to-be-compensated voice signal, and wherein before processing the external sound signal to obtain the environmental sound attenuation signal and the voice attenuation signal, the method further comprises mixing the first external environmental sound signal and the first voice signal, to obtain the external sound signal.

12. The method of claim 11, wherein before processing the first external environmental sound signal to obtain the to-be-compensated environmental signal, the method further comprises:

obtaining the signal strength of the first external environmental sound signal and the signal strength of the first voice signal; and adjusting an environmental sound filter parameter and/or a voice filter parameter based on the signal strength of the first external environmental sound signal and the signal strength of the first voice signal, wherein processing the first external environmental sound signal to obtain the to-be-compensated environmental signal comprises processing the first external environmental sound signal based on the environmental sound filter parameter, to obtain the to-be-compensated environmental signal, and wherein processing the first voice signal to obtain the to-be-compensated voice signal comprises processing the first voice signal based on the voice filter parameter, to obtain the to-be-compensated voice signal.

13. The method of claim 12, wherein adjusting the environmental sound filter parameter and/or the voice filter parameter based on the signal strength of the first external environmental sound signal and the signal strength of the first voice signal comprises:

reducing the environmental sound filter parameter when a difference between the signal strength of the first external environmental sound signal and the signal strength of the first voice signal is less than a first set threshold; and increasing the voice filter parameter when the difference between the signal strength of the first external environmental sound signal and the signal strength of the first voice signal is greater than a second set threshold.

14. The method of claim 11, wherein before processing the first external environmental sound signal to obtain the to-be-compensated environmental signal, the method further comprises wirelessly receiving a filter parameter from a terminal device, wherein the filter parameter comprises one or more of an environmental sound filter parameter, a voice filter parameter, and a feedback filter parameter.

15. A non-transitory computer program product comprising computer executable instructions that when executed by a processor, configure an electronic device to:

collect an external sound signal that comprises a first external environmental sound signal and a first voice signal, wherein a second volume is based on a signal strength of the external sound signal;

collect an in-ear sound signal that comprises a second external environmental sound signal, a second voice signal, and a blocking signal, wherein a signal strength of the second external environmental sound signal is less than a signal strength of the first external environmental sound signal, wherein a signal strength of the second voice signal is less than a signal strength of the first voice signal, and wherein a third volume is based on a signal strength of the in-ear sound signal;

process the external sound signal to obtain a to-be-compensated sound signal;

process the external sound signal to obtain an environmental sound attenuation signal and a voice attenuation signal;

remove the second external environmental sound signal and the second voice signal from the in-ear sound signal based on the environmental sound attenuation signal and the voice attenuation signal, to obtain the blocking signal;

collect a vibration signal during sound production by a user, wherein a first volume is based on an amplitude of the vibration signal;

calculate a weighted average of the first volume, the second volume, and the third volume, to obtain a target volume;

obtain a corresponding feedback filter parameter based on the target volume during sound production by the user, wherein the target volume is based on one or more of the vibration signal, the external sound signal, and the in-ear sound signal;

process the blocking signal based on the feedback filter parameter to obtain an inverted noise signal;

mix the to-be-compensated sound signal and the inverted noise signal to obtain a mixed audio signal; and play the mixed audio signal.

16. The computer program product of claim 15, wherein the processor is configured to execute the instructions to configure the electronic device to:

obtain a first strength of a low-frequency component in the external sound signal and a second strength of a low-frequency component in the in-ear sound signal;

obtain a corresponding feedback filter parameter based on the first strength, the second strength, and a strength threshold; and process the blocking signal based on the feedback filter parameter to obtain the inverted noise signal.

17. The computer program product of claim 16, wherein the processor is configured to execute the instructions to configure the electronic device to:

obtain a third strength based on an absolute value of a difference between the first strength and the second strength;

obtain a strength difference based on a difference between the third strength and the strength threshold; and obtain the corresponding feedback filter parameter based on the strength difference.

18. The computer program product of claim 15, wherein the external sound signal comprises collecting a first external sound signal through a reference microphone, and collecting a second external sound signal through a call microphone, wherein processing the external sound signal to obtain the to-be-compensated sound signal comprises:

processing the first external sound signal and the second external sound signal, to obtain the first external environmental sound signal and the first voice signal;

processing the first external environmental sound signal to obtain a to-be-compensated environmental signal; and processing the first voice signal to obtain a to-be-compensated voice signal, wherein the to-be-compensated sound signal comprises the to-be-compensated environmental signal and the to-be-compensated voice signal, and wherein before processing the external sound signal to obtain the environmental sound attenuation signal and the voice attenuation signal, the method further comprises mixing the first external environmental sound signal and the first voice signal, to obtain the external sound signal.

19. The computer program product of claim 18, wherein the processor is configured to execute the instructions to configure the electronic device to, before processing the first external environmental sound signal to obtain the to-be-compensated environmental signal:

obtain the signal strength of the first external environmental sound signal and the signal strength of the first voice signal; and adjust an environmental sound filter parameter and/or a voice filter parameter based on the signal strength of the first external environmental sound signal and the signal strength of the first voice signal, wherein processing the first external environmental sound signal to obtain the to-be-compensated environmental signal comprises processing the first external environmental sound signal based on the environmental sound filter parameter, to obtain the to-be-compensated environmental signal, and wherein processing the first voice signal to obtain the to-be-compensated voice signal comprises processing the first voice signal based on the voice filter parameter to obtain the to-be-compensated voice signal.

20. The computer program product of claim 15, wherein adjusting the environmental sound filter parameter and/or the voice filter parameter based on the signal strength of the first external environmental sound signal and the signal strength of the first voice signal comprises:

reducing the environmental sound filter parameter when a difference between the signal strength of the first external environmental sound signal and the signal strength of the first voice signal is less than a first set threshold; and increasing the voice filter parameter when the difference between the signal strength of the first external environmental sound signal and the signal strength of the first voice signal is greater than a second set threshold.

* * * * *